(12) United States Patent
Chang

(10) Patent No.: US 7,893,159 B2
(45) Date of Patent: Feb. 22, 2011

(54) BLENDS OF STYRENIC BLOCK COPOLYMERS AND PROPYLENE-ALPHA OLEFIN COPOLYMERS

(75) Inventor: Andy C. Chang, Houston, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 12/097,856

(22) PCT Filed: Dec. 22, 2006

(86) PCT No.: PCT/US2006/049175
§ 371 (c)(1),
(2), (4) Date: Jun. 17, 2008

(87) PCT Pub. No.: WO2007/094866
PCT Pub. Date: Aug. 23, 2007

(65) Prior Publication Data
US 2008/0319130 A1    Dec. 25, 2008

(51) Int. Cl.
*C08L 53/02*    (2006.01)

(52) U.S. Cl. ............... 525/98; 525/88; 525/240; 525/241; 525/242; 526/348.1

(58) Field of Classification Search ............ 525/88, 525/240, 241, 242, 98; 526/348.1
See application file for complete search history.

(56) References Cited

U.S. PATENT DOCUMENTS

| | | | |
|---|---|---|---|
| 3,494,942 A | 2/1970 | Miki et al. | |
| RE27,145 E | 6/1971 | Jones | |
| 3,634,594 A | 1/1972 | Hiyama | |
| 3,670,054 A | 6/1972 | De La Mare et al. | |
| 3,700,633 A | 10/1972 | Wald et al. | |
| 4,789,699 A | 12/1988 | Kieffer et al. | |
| 5,093,422 A * | 3/1992 | Himes ............... | 525/98 |
| 5,304,599 A | 4/1994 | Himes | |
| 5,332,613 A | 7/1994 | Taylor et al. | |
| 5,504,172 A | 4/1996 | Imuta et al. | |
| 6,171,681 B1 * | 1/2001 | Mascarenhas et al. ...... | 428/141 |
| 6,312,795 B1 * | 11/2001 | Yamamoto ............. | 428/323 |
| 6,582,829 B1 | 6/2003 | Quinn et al. | |
| 6,960,635 B2 | 11/2005 | Stevens et al. | |
| 2004/0122408 A1 | 6/2004 | Potnis et al. | |
| 2004/0122409 A1 | 6/2004 | Thomas et al. | |
| 2004/0242784 A1 * | 12/2004 | Tau et al. .............. | 525/240 |

FOREIGN PATENT DOCUMENTS

| | | |
|---|---|---|
| EP | 0712892 | 5/1996 |
| WO | 0001745 | 1/2000 |
| WO | 2004041928 | 5/2004 |

OTHER PUBLICATIONS

Othmer Kirk, vol. 16, pp. 402-420, 1981.
Othmer Kirk, vol. 18, pp. 191-192, 1982.
Randall, Journal of Molecular Science, C. 29 (2&3), 201-317, 1989.
Scholte, J., Appl. Polym Sci, 29, 3763-3782, 1984.
Otocka, Macromolecules, vol. 4, No. 4, 507-514, 1971.
Wild, Journal of Polymer Science, Polymer Physics Ed., 20, 441-455, 1982.
Hazlitt, Journal of Applied Science: Appl Polymer. Symp, 45, 25-37, 1990.

* cited by examiner

*Primary Examiner*—Vasu Jagannathan
*Assistant Examiner*—Mark S Kaucher
(74) *Attorney, Agent, or Firm*—Whyte Hirschboeck Dudek SC

(57) ABSTRACT

The present invention includes a composition comprising a propylene-alpha olefin copolymer having at least seventy weight percent units derived from propylene, and from ten to twenty five weight percent units derived from ethylene or a C4-C10 alpha olefin, the propylene-alpha olefin copolymer exhibiting a heat of fusion of less than 37 Joules/gram and a melt flow rate of from 0.1 to 100 gram/10 minutes; and a styrenic block copolymer, wherein the weight ratio of the propylene-alpha olefin copolymer to the styrenic block copolymer is from 3:7 to 7:3. The composition exhibits tensile modulus of less than 20 MPa, tensile strength of at least 5 MPa, and elongation at break of at least 900% with low relative immediate set.

18 Claims, 8 Drawing Sheets

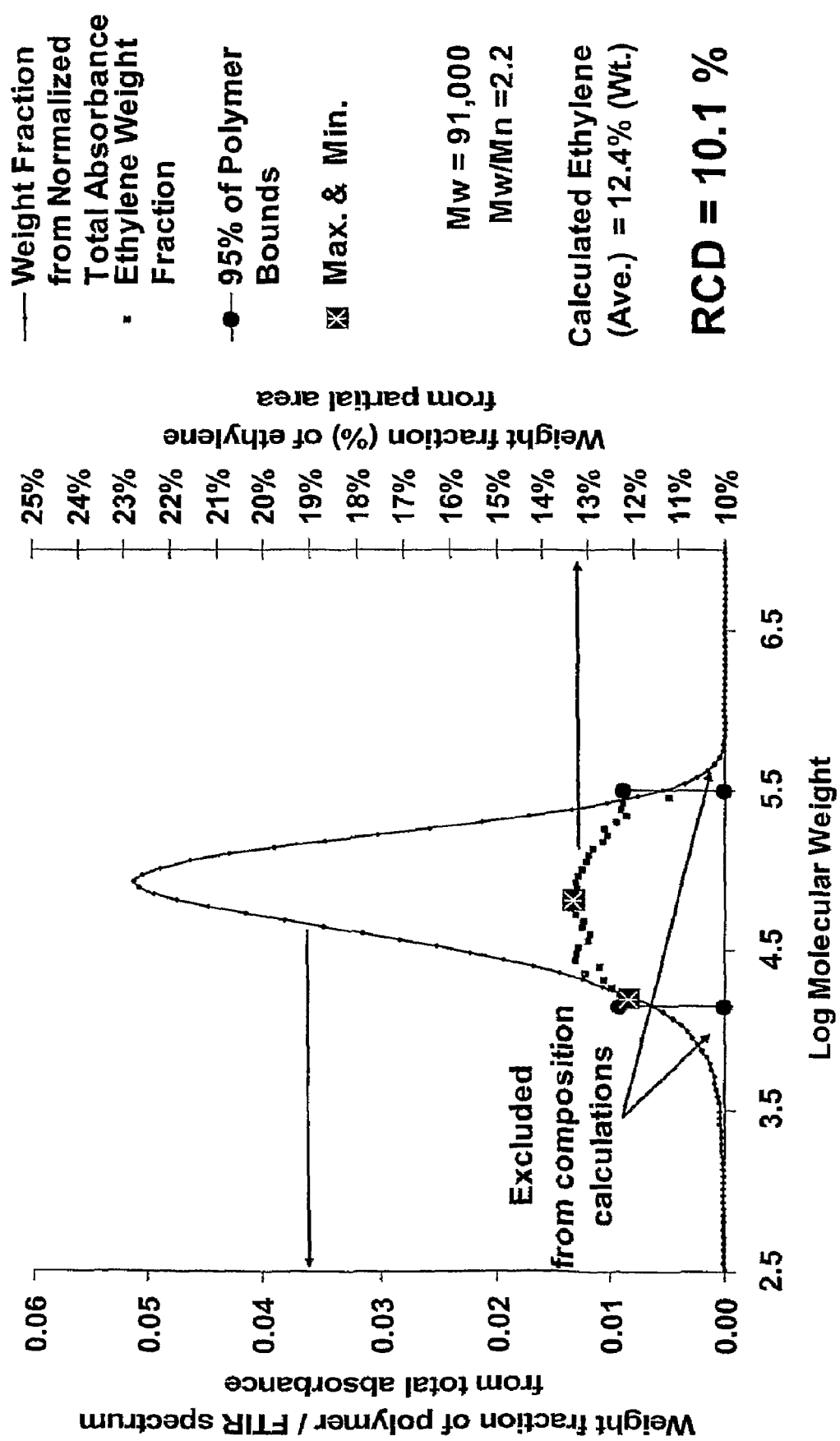

BLENDS OF STYRENIC BLOCK COPOLYMERS AND PROPYLENE-ALPHA OLEFIN COPOLYMERS

FIELD

This invention pertains to compositions of propylene-alpha olefin copolymers and styrenic block copolymers. More particularly, the invention pertains to elastomeric compositions containing low crystallinity propylene-alpha olefin copolymers and styrenic block copolymers.

BACKGROUND

Styrenic block copolymers, such as SEBS (polystyrene-saturated polybutadiene-polystyrene), SBS (polystyrene-polybutadiene-polystyrene), SEPS (polystyrene-saturated polyisoprene-polystyrene), SIS (polystyrene-polyisoprene-polystyrene), and SEPSEP are known in the art. They exhibit excellent physical properties, such as elasticity and flexibility. However, they often cannot be readily processed on typical polyolefin processing equipment, without the need for flow enhancers and other processing aids.

Propylene-alpha olefin copolymers are readily processible using typical polyolefin processing equipment. However, propylene-alpha olefin copolymers typically are not as flexible and elastic as styrenic block copolymers.

It would be desirable to have a thermoplastic elastomer composition which exhibits excellent physical properties, such as elasticity and flexibility, while at the same time being readily processible using typical polyolefin processing equipment.

OBJECTS OF THE INVENTION

One object of the invention is to provide a composition containing a propylene-alpha olefin copolymer (preferably, a propylene-based elastomer) and also containing a styrenic block copolymer. The composition should be flexible (typically, a 2% secant tensile modulus less than 20 MPa, preferably less than 15 MPa, and more preferably less than 10 MP as measured by using ASTM D1708 geometry with a 22.25 millimeter gauge length and a 111.25 millimeter/minute extension rate (500%/minute strain rate)), have a high tensile strength (typically, at least 5 MPa, preferably at least 10 MPa measured using the geometry of ASTM D1708 and the strain rate described above), be highly extensible (typical elongation to break of at least 900% as measured by using ASTM D1708 geometry and a 22.25 millimeter initial gauge length corresponding to the strain rate described above) and have relatively low immediate set in a 2-cycle 500% hysteresis test. Additionally, the composition should be readily processible on typical polyolefin processing equipment. Flow enhancers or other processing aids are optional. Preferably the composition should have a melt flow rate from 1 to 100 g/10 min more preferably from 5 to 75 g/10 min, further more preferably from 10 to 60 g/10 min, and most preferably from 12 to 50 g/10 min (ASTM 1238, 2.16 kg, 230° C.).

SUMMARY

In a first embodiment, the invention is a composition comprising:
(a) A propylene-alpha olefin copolymer having substantially isotactic propylene sequences and at least seventy weight percent (70 wt %) units derived from propylene and from ten to twenty-five weight percent (10-25 wt %) units derived from a C2, or a C4-C10 alpha olefin, the propylene-alpha olefin exhibiting a heat of fusion by DSC analysis of from 0 Joules/gram to 37 Joules/gram and a melt flow rate of between 0.1 and 50 g/10 minutes; and
(b) a styrenic block copolymer, wherein the weight ratio of the propylene-alpha olefin copolymer to the styrenic block copolymer is from 3:7 to 7:3 and wherein the composition exhibits the following:
(1) 2% secant tensile modulus as measured using the sample geometry of ASTM-D1708 of less than 20 MPa at a strain rate of 500%/minute, preferably less than 18 MPa, more preferably less than 10 MPa and in some preferred aspects less than 7 MPa, and most preferably less than 6 MPa;
(2) elongation at break of at least 900%, preferably at least 950%, more preferably at least 1000% at a strain rate of 500%/minute;
(3) tensile strength of at least 5 MPa, preferably at least 7 MPa, more preferably at least 10 MPa, and, in some particularly preferred aspects, at least 15 MPa (as measured using the samples geometry of ASTM-D1708 and a strain rate of 500%/minute); and
(4) a relative immediate set after an initial application of 400% strain of less than 2X, where X is the immediate set exhibited by component (B) alone after the application of the 400% strain 2-cycle test.

In a second embodiment, the invention is a composition, the composition consisting essentially of:
(a) at least one propylene-alpha olefin copolymer having substantially isotactic propylene sequences and at least seventy weight percent (70 wt %) units derived from propylene and from ten to twenty five weight percent (10-25 wt %) units derived from a C2, or a C4-C10 alpha olefin, the propylene-alpha olefin exhibiting a heat of fusion by DSC analysis of from 2 Joules/gram to 30 Joules/gram and a melt flow rate of between 0.2 and 40 g/10 minutes; and
(b) at least one styrenic block copolymer, wherein the weight ratio of the propylene-alpha olefin copolymer to the styrenic block copolymer is from 3:7 to 7:3 and wherein the composition exhibits the following:
(1) 2% secant tensile modulus as measured using the sample geometry of ASTM-D1708 of less than 18 MPa at a strain rate of 500%/minute, more preferably less than 10 MPa, and in some preferred aspects less than 7 MPa, most preferably less than 6 MPa;
(2) elongation at break of at least 950%, more preferably at least 1000% at a strain rate of 500%/minute;
(3) tensile strength (as determined using the sample geometry of ASTM-D1708 and a strain rate of 500%/minute) of at least 10 MPA, and in some particularly preferred aspects at least 15 MPa;
(4) a relative immediate set after an initial application of 400% strain of less than 2X, where X is the immediate set exhibited by component (B) alone after the initial application of the 400% strain 2-cycle.

In a third embodiment, the invention is a composition comprising:
(a) A propylene-alpha olefin copolymer having substantially isotactic propylene sequences and at least seventy weight percent (70 wt %) units derived from propylene and from ten to twenty five weight percent (10-25 wt %) units derived from a C2, or a C4-C10 alpha olefin, the propylene-alpha olefin exhibiting a heat of fusion by DSC analysis of from 1 Joules/gram to 37 Joules/gram and a melt flow rate of between 0.1 and 40 g/10 minutes; and (b) a styrenic block copolymer, wherein the weight ratio of the propylene-alpha olefin copolymer to the styrenic block copolymer is from 3:7 to 7:3 and wherein the composition exhibits the following:

(1) 2% Secant tensile modulus as determined using the sample geometry of ASTM-D1708 (at a strain rate of 500%/minute) of less than 20 MPa, preferably less than 18 MPa, more preferably less than 10 MPa and in some preferred aspects less than 7 MPa;

(2) elongation at break of at least 900%, preferably at least 950%, more preferably at least 1000% at a strain rate of 500%/minute;

(3) tensile strength of at least 5 MPa, preferably at least 7 MPa, more preferably at least 10 MPa, and, in some particularly preferred aspects, at least 15 MPa (as measured using the geometry of ASTM-D1708 and a strain rate of 500%/minute); and (4) an immediate set less than 120% strain after a 2-cycle 500% hysteresis test, preferably less than 100% strain, more preferably less than 89% strain, and most preferably less than 60%.

In a fourth embodiment, the invention is an article incorporating the compositions of any of the first through the third embodiments. Preferred articles comprise diaper tabs, side panels (elastic laminates comprising at least one nonwoven and one elastic component such as film or tape or filament), medical drapes, adult incontinence articles, training pants, household articles, food storage wrap, soft grip overmoldings such as those used in tool handles etc.

The inventive compositions have a surprising balance of elasticity, tensile strength, immediate set, elongation at break, and solvent resistance in comparison to conventional blends of styrenic block copolymer and conventional polyolefins.

FIGURES

Figure 4:
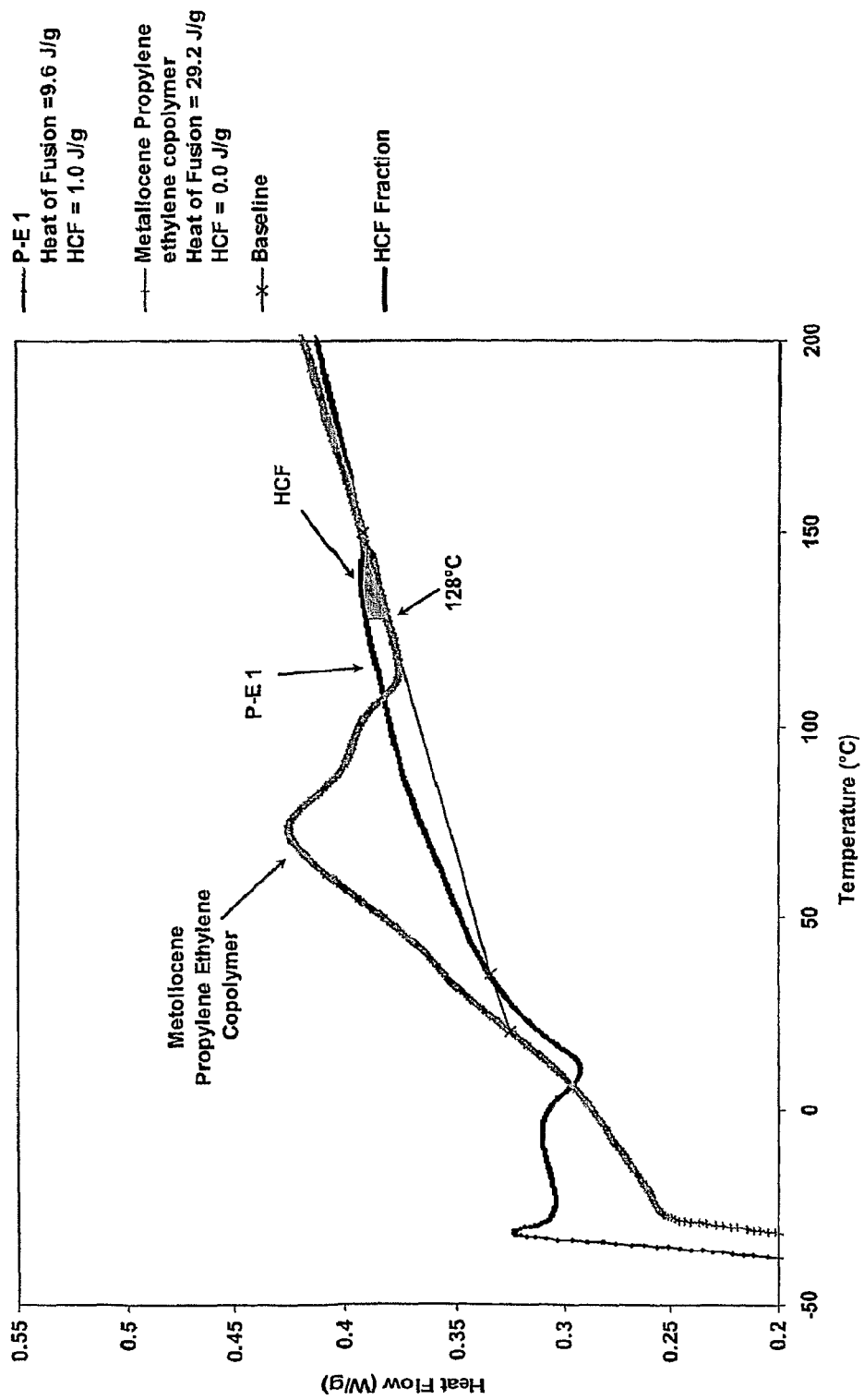

FIG. 4 shows a comparison of broad and narrow crystallinity distributions by DSC for a propylene-ethylene copolymer (P-E 1) similar to P/E-4 of the Examples, except it has a melt flow rate of 12 gram/10 min, a content of units derived from ethylene of 15 percent by weight, a heat of fusion of about 9.6 J/g, and a MWD of 2.46, and a metallocene catalyzed propylene-ethylene copolymer having about 13.7 weight percent units derived from ethylene and a melt flow rate of approximately 150 g/10 minutes. The figure also shows the high crystalline fraction (HCF) partial area relative to the area representing the heat of fusion.

Figure 5:
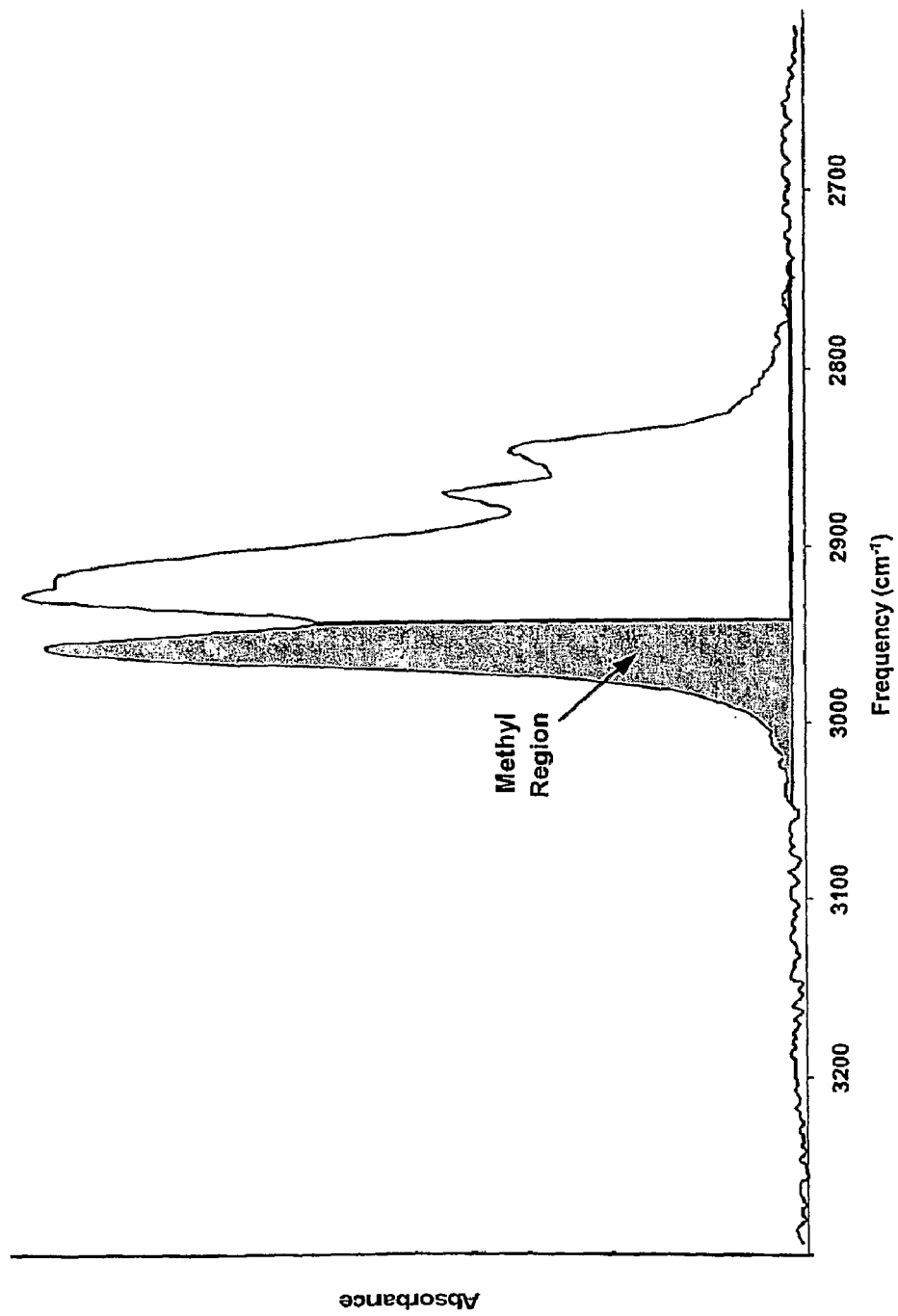

FIG. 5 shows an example infrared spectrum for a propylene-ethylene copolymer. The spectrum is from a GPC-FTIR system and shows the carbon-hydrogen stretching regions. The absorbances at frequencies greater than 2940 $cm^{-1}$ are calculated as a fraction of the total absorbance from 2750 $cm^{-1}$ to 3050 $cm^{-1}$ and used to calculate the weight fraction of propylene.

Figure 6:
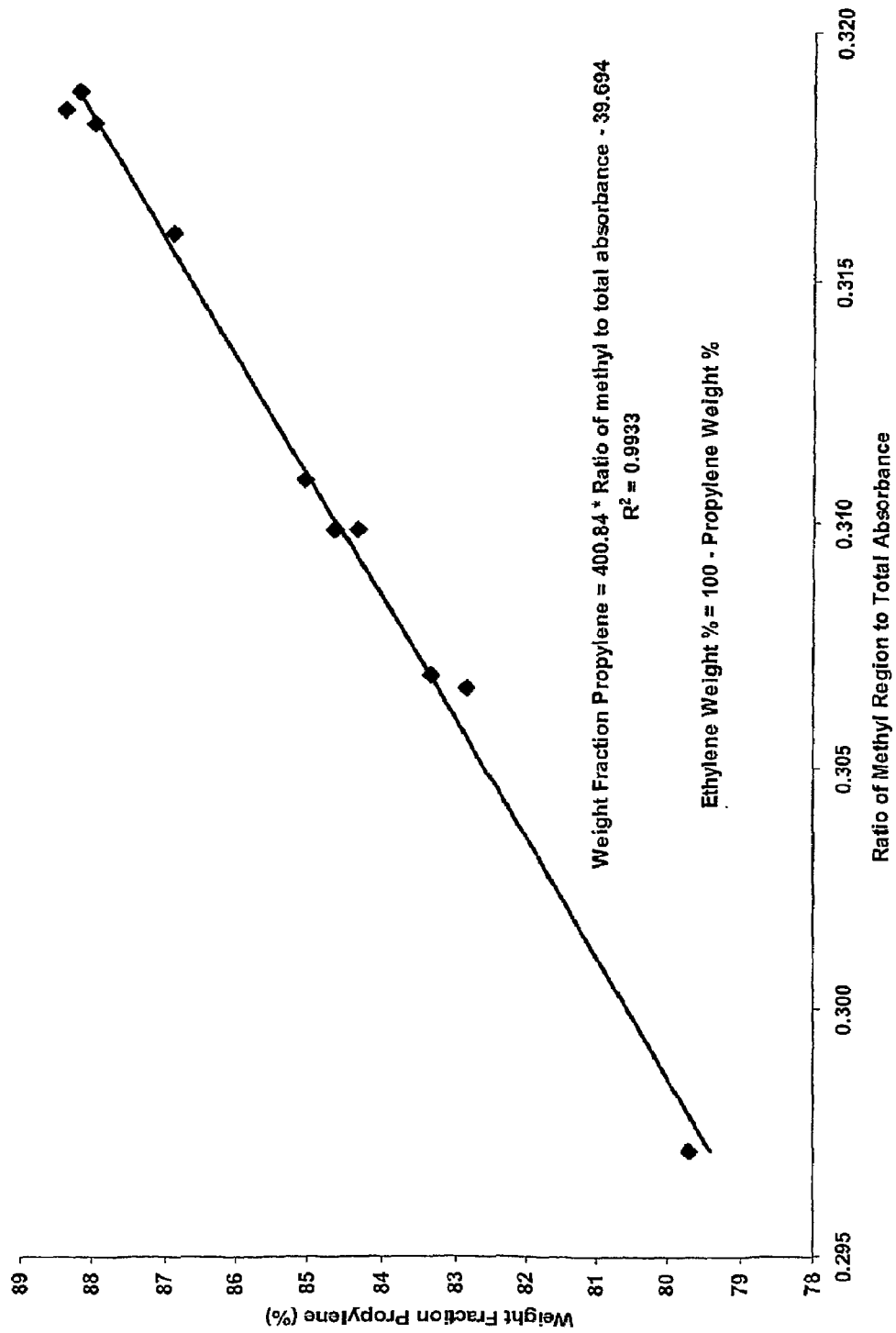

FIG. 6 shows the calibration used to calculate the propylene weight fraction using the total area and a partial area from the absorbances at frequencies greater than 2940 $cm^{-1}$ in an infrared spectrum such as in FIG. 5.

Figure 7:
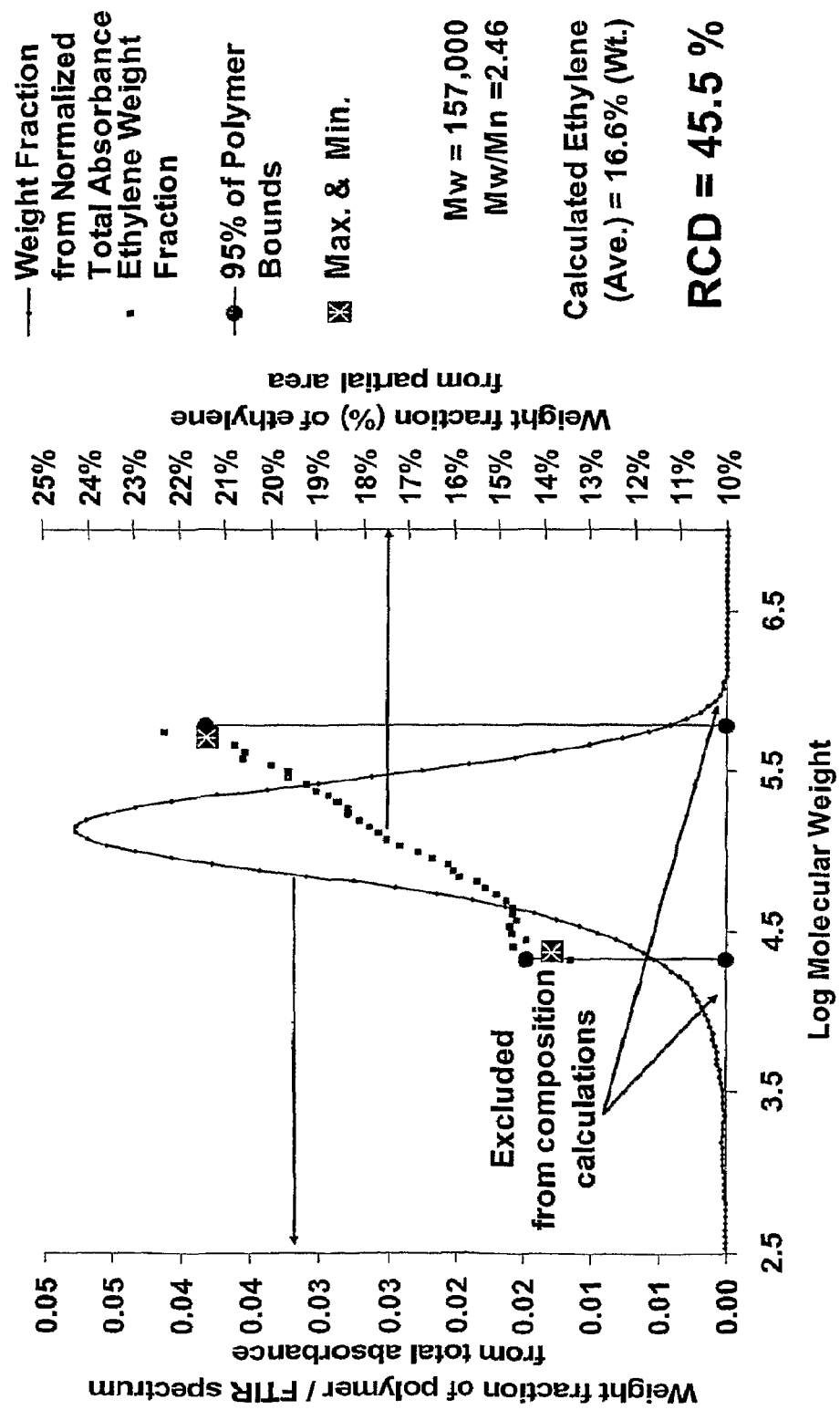

FIG. 7 shows the composition distribution by GPC-FTIR for the propylene-ethylene copolymer (P-E 1) of FIG. 4. The key data represented are the total normalized absorbance at each spectrum (elution volume), the ethylene weight fraction for each spectrum (elution volume), and the relative composition drift ("RCD") for the composition distribution. Compositions are only calculated for 95% (by weight) of the spectra representing the highest concentrations of the polymer to avoid errors caused by low signal to noise.

FIG. 8 shows the composition distribution by GPC-FTTR for a metallocene propylene ethylene copolymer having 13.7 percent by weight units derived from ethylene (as calculated by the NMR method described earlier). The key data represented are the total normalized absorbance at each spectrum (elution volume), the ethylene weight fraction for each spectrum (elution volume), and the relative composition drift ("RCD") for the composition distribution. Compositions are only calculated for 95% (by weight) of the spectra representing the highest concentrations of the polymer to avoid errors caused by low signal to noise.

DETAILED DESCRIPTION

Styrenic Block Copolymer

Examples of Styrenic block copolymers suitable for the invention are described in EP0712892B1, WO204041538A1, U.S. Pat. No. 6,582,829B1; US2004/0087235A1; US2004/0122408A1; US2004/0122409A1; and U.S. Pat. No. 4,789,699; U.S. Pat. No. 5,093,422; U.S. Pat. No. 5,332,613, which are incorporated by reference for their teachings regarding styrenic block copolymers.

In general, styrenic block copolymers suitable for the invention have at least two monoalkenyl arene blocks, preferably two polystyrene blocks, separated by a block of saturated conjugated diene comprising less than 20% residual ethylenic unsaturation, preferably a saturated polybutadiene block. The preferred styrenic block copolymers have a linear structure although branched or radial polymers or functionalized block copolymers make useful compounds.

Typically, polystyrene-saturated polybutadiene-polystyrene (S-EB-S) (S is styrene, E is ethylene, and B is butylene.) and polystyrene-saturated polyisoprene-polystyrene (S-EP-S) (P is propylene) block copolymers comprise polystyrene endblocks having a number average molecular weight from 5,000 to 35,000 and saturated polybutadiene or saturated polyisoprene midblocks having a number average molecular weight from 20,000 to 170,000. The saturated polybutadiene blocks preferably have from 35% to 55% 1,2-configuration and the saturated polyisoprene blocks preferably have greater than 85% 1,4-configuration.

The total number average molecular weight of the styrenic block copolymer is preferably from 30,000 to 250,000 if the copolymer has a linear structure. Such block copolymers typically have an average polystyrene content from 10% by weight to 35% by weight.

A S-EB-S block copolymer useful in a particularly preferred aspect of the present invention is available from Kraton Polymers (Houston, Tex.) and has a number average molecular weight of 50,000 grams per mole with polystyrene endblocks each having a number average molecular weight of 7,200 grams per mole and polystyrene content of 30% by weight.

Styrenic block copolymers may be prepared by methods known to one of ordinary skill in the art. For example, the styrenic block copolymers may be manufactured using free-radical, cationic and anionic initiators or polymerization catalysts. Such polymers may be prepared using bulk, solution or emulsion techniques. In any case, the styrenic block copolymer containing at least ethylenic unsaturation will, generally, be recovered as a solid such as a crumb, a powder, a pellet, or the like.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an organoalkali metal compound in a suitable solvent at a temperature within the range from −150° C. to 300° C., preferably at a temperature within the range from 0° C. to 100° C. Particularly effective anionic polymerization initiators are organolithium compounds having the general formula: $RLi_n$ wherein R is an aliphatic, cycloaliphatic, aromatic, or alkyl-substituted aromatic hydrocarbon radical having from 1 to 20 carbon atoms; and n is an integer of 1 to 4.

In addition to sequential techniques to obtain triblocks, tetrablocks, and higher orders of repeating structures, at least anionic initiators can be used to prepare diblocks of styrene-polydiene having a reactive ("live") chain end on the diene block which can be reacted through a coupling agent to create, for example, $(S-I)_xY$ or $(S-B)_xY$ structures wherein x is an integer from 2 to 30, Y is a coupling agent, I is isoprene, B is butadiene and greater than 65 percent of S—I or S—B diblocks are chemically attached to the coupling agent. Y usually has a molecular weight which is low compared to the polymers being prepared and can be any of a number of materials known in the art, including halogenated organic compounds; halogenated alkyl silanes; alkoxy silanes; various esters such as alkyl and aryl benzoates, difunctional aliphatic esters such as dialkyl adipates and the like; polyfunctional agents such as divinyl benzene (DVB) and low molecular weight polymers of DVB. Depending on the selected coupling agent the final polymer can be a fully or partially coupled linear triblock polymer (x=2), i.e., SIYIS; or branched, radial or star configurations. The coupling agent, being of low molecular weight, does not materially affect the properties of the final polymer. DVB oligomer is commonly used to create star polymers, wherein the number of diene arms can be 7 to 20 or even higher.

It is not required in coupled polymers that the diblock units all be identical. In fact, diverse "living" diblock units can be brought together during the coupling reaction giving a variety of unsymmetrical structures, i.e., the total diblock chain lengths can be different, as well as the sequential block lengths of styrene and diene.

Preferably, the block copolymers are hydrogenated to improve weatherability and oxidation stability. In general, the hydrogenation or selective hydrogenation of the polymer may be accomplished using any of the several hydrogenation processes known in the prior art. For example the hydrogenation may be accomplished using methods such as those taught, for example, in U.S. Pat. Nos. 3,494,942; 3,634,594; 3,670,054; 3,700,633; and Re. 27,145, which are incorporated by reference for their teaching regarding hydrogenation of styrenic block copolymers and the polymers that result therefrom. The methods known in the prior art for hydrogenating polymers containing ethylenic unsaturation and for hydrogenating or selectively hydrogenating polymers containing aromatic and ethylenic unsaturation, involve the use of a suitable catalyst, particularly a catalyst or catalyst precursor comprising an iron group metal atom, particularly nickel or cobalt, and a suitable reducing agent such as an aluminium alkyl.

In general, the hydrogenation will be accomplished in a suitable solvent at a temperature within the range from 20° C. to 100° C. and at a hydrogen partial pressure within the range from 7 atm ($10^5$ Pa) to 340 atm ($10^5$ Pa), preferably 7 atm ($10^5$ Pa) to 70 atm ($10^5$ Pa). Catalyst concentrations within the range from 10 ppm (wt) to 500 ppm (wt) of iron group metal based on total solution are generally used and contacting at hydrogenation conditions is generally continued for a period of time within the range from 60 to 240 minutes. After the hydrogenation is completed, the hydrogenation catalyst and catalyst residue will, generally, be separated from the polymer.

Propylene-Alpha Olefin Copolymer:

The weight ratio of the propylene-alpha olefin copolymer to the styrenic block copolymer is from 3:7 to 7:3, preferably from 3:7 to 65:35, more preferably from 4:6 to 6:4, further more preferably from 45:55 to 55:45. The propylene-alpha olefin copolymer typically comprises from 30 to 70 percent by weight of the total polymer composition, preferably from 30 to 65 percent by weight, more preferably from 40 to 60 percent by weight, and further more preferably from 45 to 55 percent by weight of the total weight of polymers in the composition. When the propylene-alpha olefin copolymer has a heat of fusion of greater than 22 J/gram, the propylene-alpha olefin copolymer preferably makes up 50% or less of the thermoplastic polymers in the composition, more preferably less than 40 percent of the thermoplastic polymers in composition.

The propylene-alpha olefin copolymer of the current invention is characterized as having substantially isotactic propylene sequences. "Substantially isotactic propylene sequences" and similar terms mean that the sequences have an isotactic triad (mm) measured by $^{13}C$ NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}C$ NMR spectra. NMR spectra are determined as described below.

The propylene-alpha olefin copolymers of the invention typically have a melt flow rate (MFR) of at least 0.1 g/10 min, preferably at least 0.3, and more preferably at least 1.0 g/10 minute. Preferably, the inventive composition fulfills the following equation:

$$\frac{\eta_{SBC}}{\eta_{PBPE}} \leq \frac{\phi_{SBC}}{\phi_{PBPE}}$$

where $\eta_{SBC}$ is the viscosity of the styrene block copolymer, $\eta_{PBPE}$ is the viscosity of the propylene-alpha olefin copolymer, $\phi_{SBC}$ is the volume of the styrene block copolymer, $\phi_{PBPE}$ is the volume of the propylene-alpha olefin copolymer in the formulation.

The above viscosity ratio is determined by the following method:

A TA Instruments Ares LS Model (New Castle, Del., USA) dynamic mechanical spectrometer equipped with 25 millimeter diameter parallel plates is used to determine the dynamic rheological data. A frequency sweep with five logarithmically spaced points per decade is run from 0.1 to 100 rad/s at $T_{expt}$ such that $T_{expt}$ is the temperature specific to the conversion method and the processing condition. The strain is determined to be within the linear viscoelastic regime by performing a strain sweep at 0.1 rad/s and $T_{expt}$ (° C.), by strain sweep from 2 to 30 percent strain in 2 percent steps to determine the minimum required strain to produce torques within the specification of the transducer; another strain sweep at 100 rad/s and $T_{expt}$ ° C. is used to determine the maximum strain before nonlinearity occurs according to the procedure disclosed by J. M. Dealy and K. F. Wissbrun, "Melt Rheology and Its Role in Plastics Processing", Van Nostrand, N.Y. (1990). All testing is performed in a nitrogen purge to minimize oxidative degradation. For similar rheological behavior, the ratio of viscosity is taken at the shear rate being used in the application. If the strain rate of the application is beyond the measurable range of the instrument, the ratio of viscosity is taken at a shear rate of 100 radians per second (rad/s).

At 100 rad/s, the viscosity and volume relationship is $$0 \leq \frac{\eta_A}{\eta_B} \leq \frac{\phi_A}{\phi_B} + 0.2$$

The more preferred viscosity and volume relationship is $$0 \leq \frac{\eta_A}{\eta_B} \leq \frac{\phi_A}{\phi_B}$$

The most preferred viscosity and volume relationship is $$0 \leq \frac{\eta_A}{\eta_B} \leq \frac{\phi_A}{\phi_B} - 0.2$$

such that $\eta_A$ is viscosity of phase A; $\eta_B$ is viscosity of phase B; $\phi_A$ is the volume fraction of phase A; and $\phi_B$ is the volume fraction of phase B. Phase A is preferably rich in styrenic block copolymer (SBC) component. Phase B is preferably rich in the propylene-alpha olefin copolymer (PBPE) component.

Volume ratio of the phases can be determined from the formulation by dividing the weight percent of each component by its respective density. Volume ratio can be determined on existing formulations based on area analysis of sample cross sections. Cross sections may be obtained typically from a variety of methods including microtomy which may or may not include microtomy under cryogenic conditions to minimize sample deformation. Typically, multiple sections are obtained in this manner. Area analysis is performed on images obtained using a microscopic technique that is capable of differentiating the separate phases. Microscopic methods include but are not limited to optical microscopy, optical microscopy using polarized light, scanning electron microscopy, transmission electron microscopy, and atomic force microscopy. These microscopy methods may or may not require additional sample preparation methods to show contrast between the separate phases. Such sample preparation methods include but are not limited to differential staining methods. For example ruthenium tetroxide is commonly used to stain thin sections for transmission electron microscopy. Typically, area analysis is then performed using image analysis software such as Image Pro (Media Cybernetics Inc, Silver Springs Ga.) on the section. This is typically repeated on sufficient sections to obtain a statistically significant measurement of area ratio of the phases which can then be converted to volume ratio of the phases.

The propylene-alpha olefin copolymer of the invention is comprised from units derived from propylene and from polymeric units derived from alpha-olefins. The preferred comonomers utilized to manufacture the propylene-alpha olefin copolymer are C2, and C4 to C10 alpha-olefins, preferably C2, C4, C6 and C8 alpha-olefins, most preferably ethylene.

The propylene-based copolymer of the invention comprise at least 70% by weight units derived from propylene and exhibit a heat of fusion of from 0 to 37 Joules/gram as determined by differential scanning calorimetry. The propylene-based copolymer of this invention comprise from 12 to 24 mole percent units derived from the alpha-olefin comonomer, more preferably from 14 to 22 mole percent units derived from the alpha-olefin comonomer. When ethylene is the comonomer, the propylene-based copolymer comprises from 10 to 25 percent by weight units derived from ethylene, preferably from 10 to 19 weight percent units derived from ethylene, more preferably from 11 to 17 weight percent units derived from ethylene, further more preferably from 12 to 16 weight percent units derived from ethylene, most preferably from 13 to 15 weight percent units derived from ethylene. The heat of fusion is preferably 1 to 37 J/g, more preferably 2 to 30 J/g, further more preferably 4 to 25 J/g, and most preferably 4 to 19 J/g.

$^{13}$C NMR spectroscopy is one of a number of techniques known in the art for measuring comonomer incorporation into a polymer. An example of this technique is described for the determination of comonomer content for ethylene/α-olefin copolymers in Randall (*Journal of Macromolecular Science, Reviews in Macromolecular Chemistry and Physics*, C29 (2 & 3), 201-317 (1989)). The basic procedure for determining the comonomer content of an olefin interpolymer involves obtaining the $^{13}$C NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotropically labeled comonomer. The mole % comonomer can be determined by the ratio of the integrals corresponding to the number of moles of comonomer to the integrals corresponding to the number of moles of all of the monomers in the interpolymer, as described in Randall, for example.

The data are collected using a Varian UNITY Plus 400 MHz NMR spectrometer, corresponding to a $^{13}$C resonance frequency of 100.4 MHz. Acquisition parameters are selected to ensure quantitative $^{13}$C data acquisition in the presence of the relaxation agent. The data is acquired using gated $^{1}$H decoupling, 4000 transients per data file, a 7 sec pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C. with periodic refluxing initiated by heat gun.

Following data collection, the chemical shifts are internally referenced to the mmmm pentad at 21.90 ppm. Isotacticity at the triad level (mm) is determined from the methyl integrals representing the mm triad (22.5 to 21.28 ppm), the mr triad (21.28-20.40 ppm), and the rr triad (20.67-19.4 ppm). The percentage of mm tacticity is determined by dividing the intensity of the mm triad by the sum of the mm, mr, and rr triads. For propylene-ethylene copolymers made with catalyst systems, such as the nonmetallocene, metal-centered, heteroaryl ligand catalyst (described below) the mr region is corrected for ethylene and regio-error by subtracting the contribution from PPQ and PPE. For these propylene-ethylene copolymers the rr region is corrected for ethylene and regio-error by subtracting the contribution from PQE and EPE. For copolymers with other monomers that produce peaks in the regions of mm, mr, and rr, the integrals for these regions are similarly corrected by subtracting the interfering peaks using standard NMR techniques, once the peaks have been identified. This can be accomplished, for example, by analyzing a series of copolymers of various levels of monomer incorporation, by literature assignments, by isotopic labeling, or other means which are known in the art.

For copolymers made using a nonmetallocene, metal-centered, heteroaryl ligand catalyst, such as described in U.S. Pat. No. 6,960,635B2 to Stevens et al. issued Nov. 1, 2005, the $^{13}$C NMR peaks corresponding to a regio-error at about 14.6 and about 15.7 ppm are believed to be the result of stereoselective 2,1-insertion errors of propylene units into the growing polymer chain. In general, for a given comonomer content, higher levels of regio-errors lead to a lowering of the melting point and the modulus of the polymer, while lower levels lead to a higher melting point and a higher modulus of the polymer.

For propylene-alpha olefin copolymers, the comonomer composition and sequence distribution may be determined using methods known to one of ordinary skill in the art. For example, the properties may be determined according to Koenig, J. W (Spectroscopy of Polymers, American Chemical Society, Washington, D.C. 1992).

In A preferred aspect, for propylene-ethylene copolymers, the following procedure can be used to determine the comonomer composition and sequence distribution. Integral areas are determined from the $^{13}$C NMR spectrum and input into a matrix calculation to determine the mole fraction of each triad sequence. The matrix assignment is then used with the integrals to yield the mole fraction of each triad. The matrix calculation is a linear least squares implementation of Randall's (*Journal of Macromolecular Chemistry and Physics, Reviews in Macromolecular Chemistry and Physics*, C29 (2&3), 201-317, 1989) method modified to include the additional peaks and sequences for the unique 2,1 regio-error described above (if present in the polymer). Table A shows the integral regions and triad designations used in the assignment matrix. The numbers associated with each carbon indicate in which region of the spectrum it will resonate.

Mathematically the Matrix Method is a vector equation s=fM where M is an assignment matrix, s is a spectrum row vector, and f is a mole fraction composition vector. Successful implementation of the Matrix Method requires that M, f, and s be defined such that the resulting equation is determined or over determined (equal or more independent equations than variables) and the solution to the equation contains the molecular information necessary to calculate the desired structural information. The first step in the Matrix Method is to determine the elements in the composition vector f. The elements of this vector should be molecular parameters selected to provide structural information about the system being studied. For copolymers, a reasonable set of parameters would be any odd n-ad distribution. Normally peaks from individual triads are reasonably well resolved and easy to assign, thus the triad distribution is the most often used in this composition vector f. The triads for the P/E copolymer are EEE, EEP, PEE, PEP, PPP, PPE, EPP, and EPE. For a polymer chain of reasonably high molecular weight ($\geq$10,000 g/mol), the $^{13}$C NMR experiment cannot distinguish EEP from PEE or PPE from EPP. Since all Markovian P/E copolymers have the mole fraction of PEE and EPP equal to each other, the equality restriction was chosen for the implementation as well. The same treatment was carried out for PPE and EPP. The above two equality restrictions reduce the eight triads into six independent variables. For clarity reason, the composition vector f is still represented by all eight triads. The equality restrictions are implemented as internal restrictions when solving the matrix. The second step in the Matrix Method is to define the spectrum vector s. Usually the elements of this vector will be the well-defined integral regions in the spectrum. To insure a determined system the number of integrals needs to be as large as the number of independent variables. The third step is to determine the assignment matrix M. The matrix is constructed by finding the contribution of the carbons of the center monomer unit in each triad (column) towards each integral region (row). One needs to be consistent about the polymer propagation direction when deciding which carbons belong to the central unit. A useful property of this assignment matrix is that the sum of each row should equal to the number of carbons in the center unit of the triad which is the contributor of the row. This equality can be checked easily and thus prevents some common data entry errors.

After constructing the assignment matrix, a redundancy check needs to be performed. In other words, the number of linearly independent columns needs to be greater or equal to the number of independent variables in the product vector. If the matrix fails the redundancy test, then one needs to go back to the second step and repartition the integral regions and then redefine the assignment matrix until the redundancy check is passed.

In general, when the number of columns plus the number of additional restrictions or constraints is greater than the number of rows in the matrix M the system is overdetermined. The greater this difference is the more the system is overdetermined. The more overdetermined the system, the more the Matrix Method can correct for or identify inconsistent data which might arise from integration of low signal to noise (S/N) ratio data, or partial saturation of some resonances.

The final step is to solve the matrix. This is easily executed in Microsoft Excel by using the Solver function. The Solver works by first guessing a solution vector (molar ratios among different triads) and then iteratively guessing to minimize the sum of the differences between the calculated product vector and the input product vector s. The Solver also lets one input restrictions or constraints explicitly.

TABLE A

The Contribution of Each Carbon on the Central Unit of Each Triad Towards Different Integral Regions

| Triad name | Structure | Region for 1 | Region for 2 | Region for 3 |
|---|---|---|---|---|
| PPP | | L | A | O |
| PPE | | J | C | O |
| EPP | | J | A | O |
| EPE | | H | C | O |
| EEEE | | K | K | |
| EEEP | | K | J | |
| EEP | | M | C | |
| PEE | | M | J | |
| PEP | | N | C | |
| PQE | | F | G | O |
| QEP | | F | F | |
| XPPQE | | J | F | O |

TABLE A-continued

The Contribution of Each Carbon on the Central Unit of Each Triad
Towards Different Integral Regions

| Triad name | Structure | Region for 1 | Region for 2 | Region for 3 |
|---|---|---|---|---|
| XPPQP | 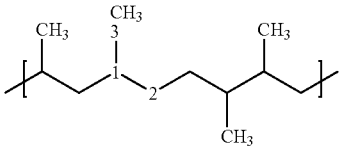 | J | E | O |
| PPQPX | 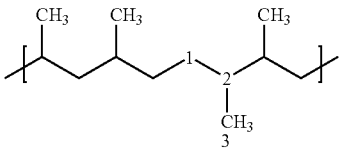 | I | D | Q |
| PQPPX | 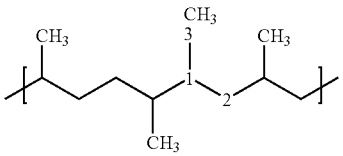 | F | B | P |

P = propylene, E = ethylene, Q = 2,1 inserted propylene.

Chemical Shift Ranges

| A | B | C | D | E | F | G | H | I |
|---|---|---|---|---|---|---|---|---|
| 48.00 | 43.80 | 39.00 | 37.25 | 35.80 | 35.00 | 34.00 | 33.60 | 32.90 |
| 45.60 | 43.40 | 37.30 | 36.95 | 35.40 | 34.50 | 33.60 | 33.00 | 32.50 |

| J | K | L | M | N | O | P | Q |
|---|---|---|---|---|---|---|---|
| 31.30 | 30.20 | 29.30 | 27.60 | 25.00 | 22.00 | 16.00 | 15.00 |
| 30.30 | 29.80 | 28.20 | 27.10 | 24.50 | 19.50 | 15.00 | 14.00 |

1,2 inserted propylene composition is calculated by summing all of the stereoregular propylene centered triad sequence mole fractions. 2,1 inserted propylene composition (Q) is calculated by summing all of the Q centered triad sequence mole fractions. The mole percent of propylene is determined by adding up all of the P centered triads and multiplying the mole fraction by 100. Ethylene composition is determined by subtracting the P and Q mole percentage values from 100.

In a particularly preferred aspect of the invention, the propylene-alpha olefin copolymer utilized in the invention comprises a propylene-ethylene copolymer made using a nonmetallocene, metal-centered, heteroaryl ligand catalyst such as described in U.S. Pat. No. 6,960,635B2 to Stevens et al. issued Nov. 1, 2005, which is incorporated by reference herein in its entirety for its teachings regarding such catalysts. For such catalysts, the term "heteroaryl" includes substituted heteroaryl. The most preferred nonmetallocene, metal-centered, heteroaryl ligand catalyst includes a Group 4 metal complex as a catalyst component which can be described by the following formula:

(IA)

wherein $G^1$ is selected from alkyl, cycloalkyl, aryl, aralkyl, alkaryl, heteroalkyl, heterocycloalkyl, heteroaryl, heteroaralkyl, heteroalkaryl, silyl, and inertly substituted derivatives thereof containing from 1 to 40 atoms not counting hydrogen, preferably a di-ortho-alkyl-substituted aryl, most preferably 2,6-diisopropylphenyl;

T is a divalent bridging group of from 10 to 30 atoms not counting hydrogen, selected from mono- or di-aryl-substituted methylene or silylene groups or mono- or di-heteroaryl-substituted methylene or silylene groups. Most preferably, at least one such aryl- or heteroaryl-substituent is substituted in one or both ortho-positions with a secondary or tertiary alkyl-group, a secondary or tertiary heteroalkyl group, a cycloalkyl group, or a heterocycloalkyl group, $G^2$ is a $C_{6-20}$ heteroaryl group containing Lewis base functionality, especially a pyridin-2-yl- or substituted pyridin-2-yl group, M is the Group 4 metal, preferably hafnium, X'''' is an anionic, neutral or dianionic ligand group, x'''' is a number from 0 to 5 indicating the number of X'''' groups, and bonds, optional bonds and electron donative interactions are represented by lines, dotted lines and arrows respectively.

Additionally, the active catalyst may also include an activator capable of converting said metal complex into an active catalyst for addition polymerization, a carrier or support, a liquid solvent or diluent, a tertiary component such as a scavenger, and/or one or more additives or adjuvants such as processing aids, sequestrants, and/or chain transfer agents.

The propylene-alpha olefin copolymers made with such nonmetallocene, metal-centered, heteroaryl ligand catalyst exhibit a unique regio-error. The regio-error is identified by $^{13}$C NMR peaks corresponding at about 14.6 and about 15.7 ppm. In this particularly preferred aspect, these peaks are of about equal intensity, and they typically represent about 0.02 to about 7 mole percent of the propylene insertions into the copolymer chain.

Figure 1:
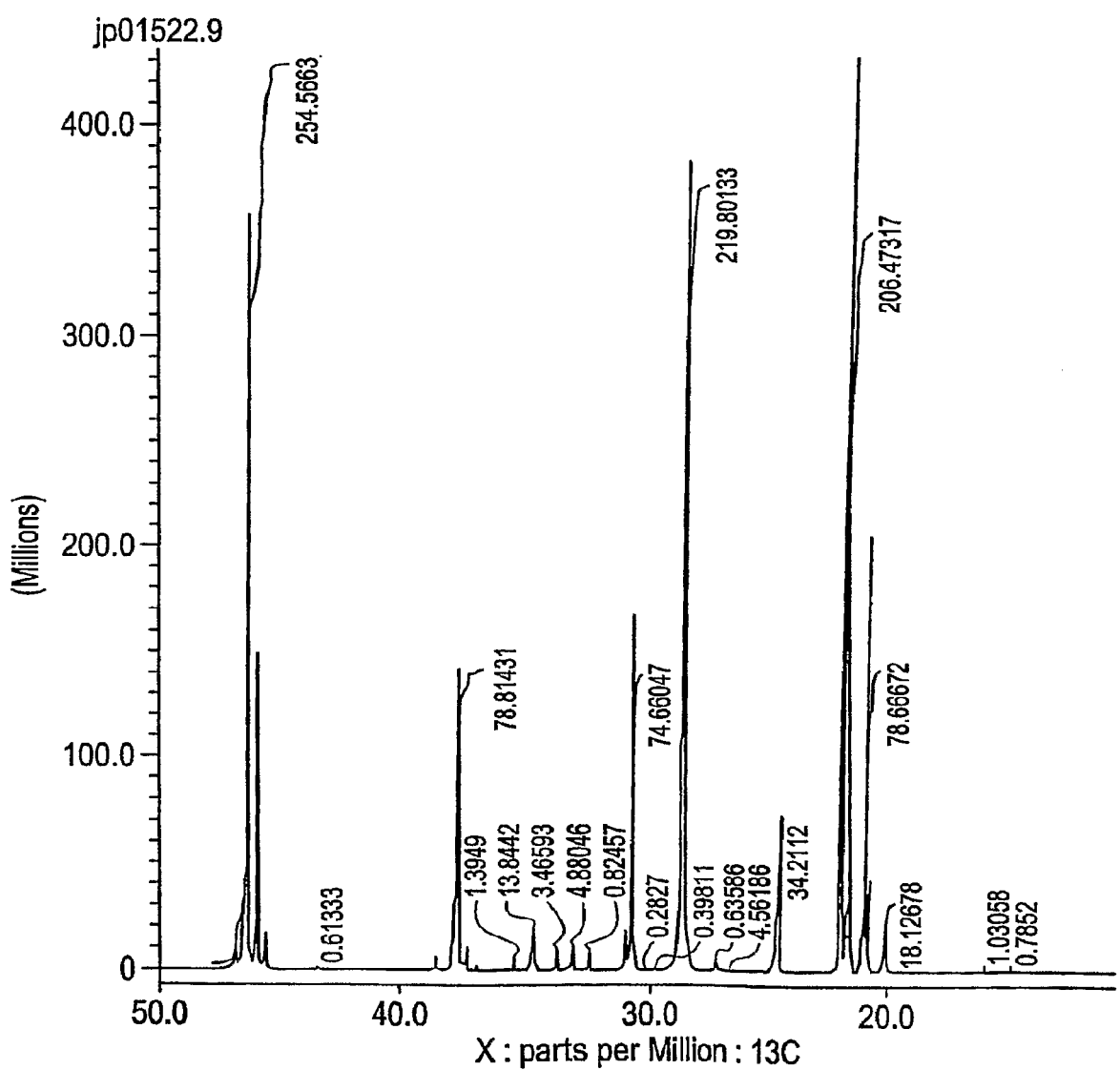
FIG. 1 shows the $^{13}C$ NMR Spectrum of a propylene-ethylene copolymer (made with an activated non-metallocene, metal centered, heteroaryl ligand catalyst similar to Catalyst A), which is similar to the propylene-ethylene copolymers described in the Examples.
Figure 2:
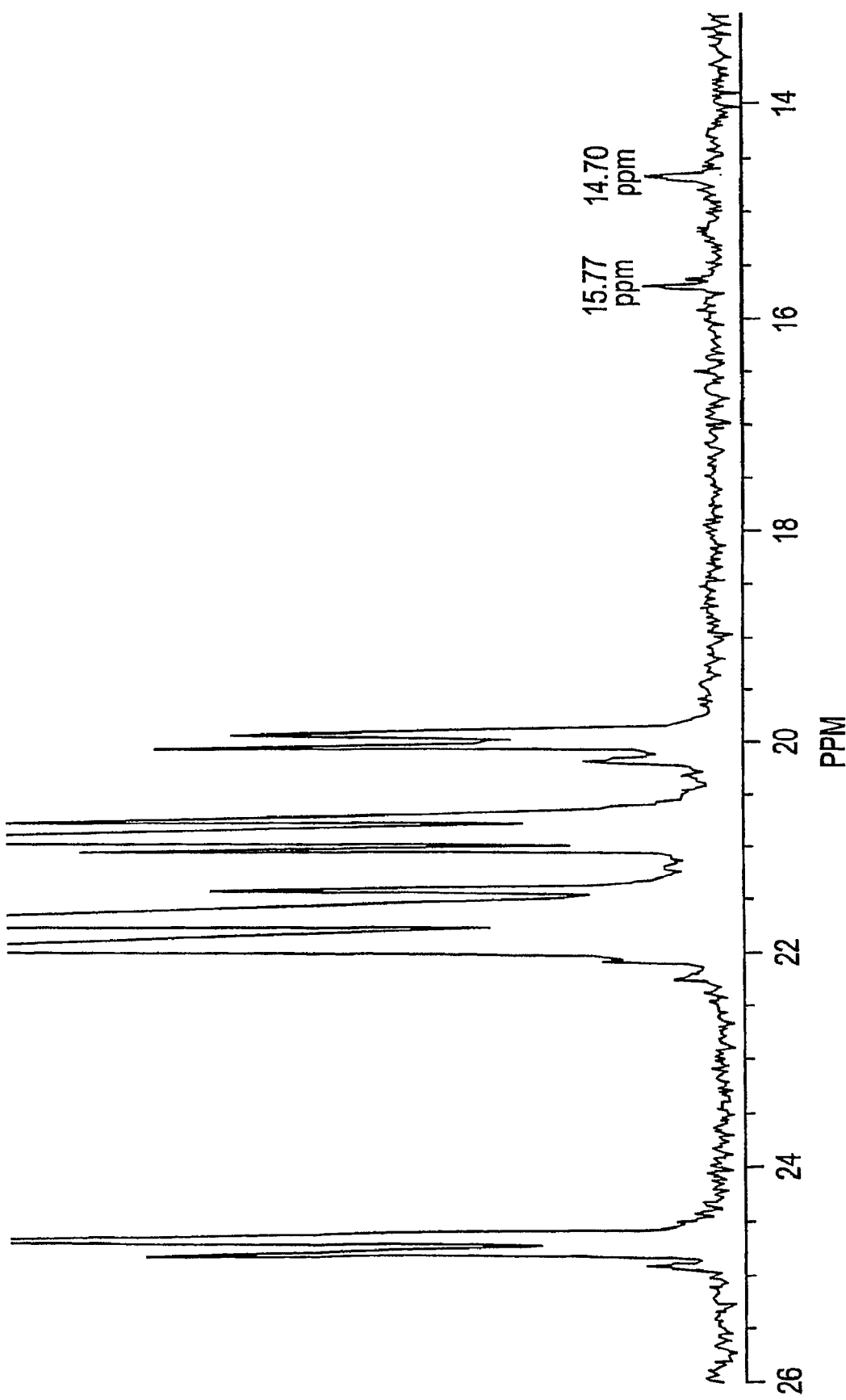
FIG. 2 shows the $^{13}C$ NMR Spectrum of same propylene-ethylene copolymer as FIG. 1. However, the spectrum is shown with an expanded Y-axis scale relative to FIG. 1, in order to more clearly show the regio-error peaks at about 14.6 and 15.7 ppm.
Figure 3:
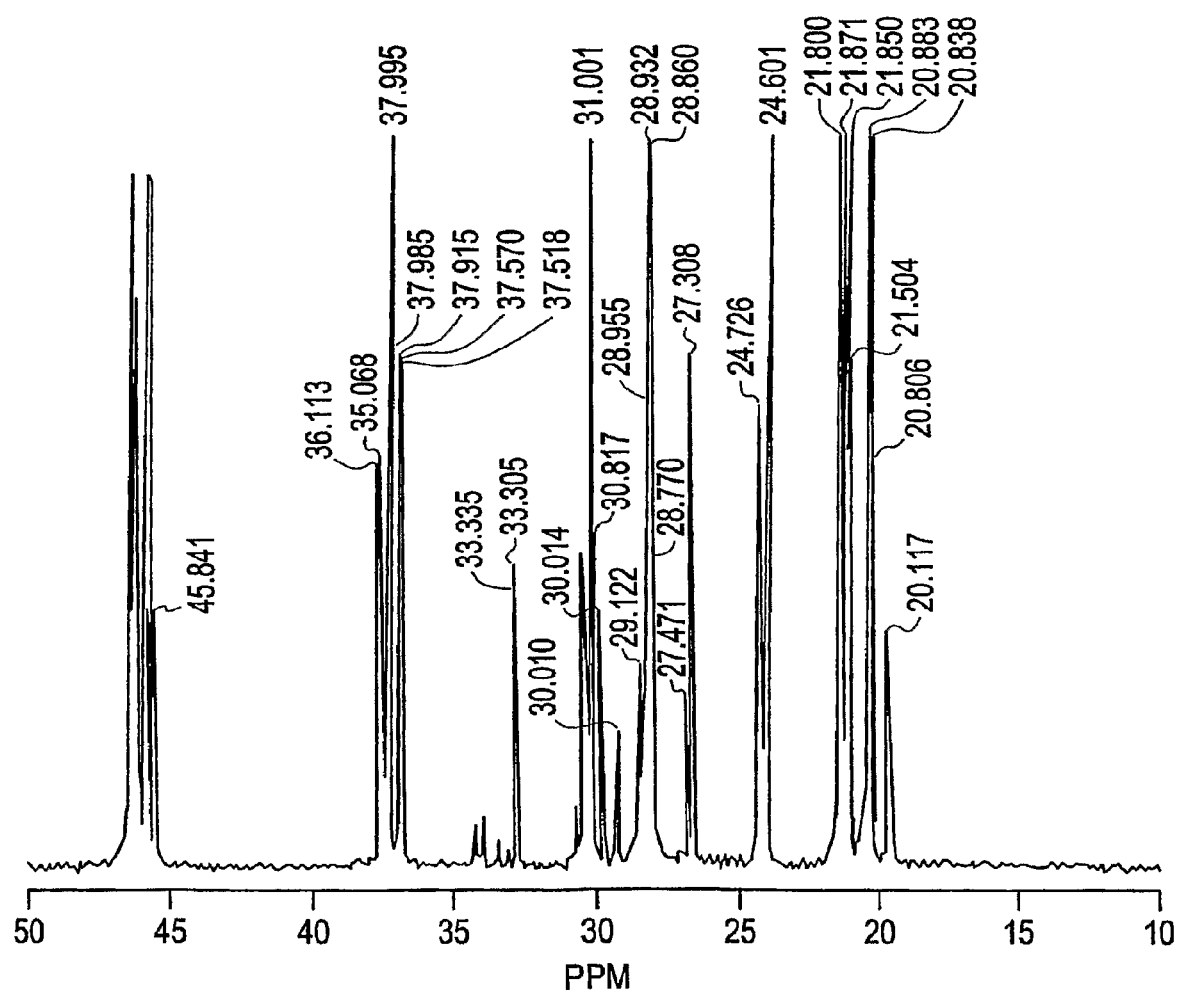
FIG. 3 shows the $^{13}C$ NMR Spectrum of a propylene-ethylene copolymer prepared using a metallocene catalyst. The figure demonstrates the absence of regio-error peaks in the region around 15 ppm for a propylene-ethylene copolymer made with a metallocene catalyst.

A comparison of several $^{13}$C NMR spectra further illustrates the unique regio-errors of propylene-ethylene copolymers utilized in the particularly preferred aspect of the invention. FIGS. 1 and 2 are the spectra of the propylene-ethylene copolymers similar to the propylene-ethylene copolymers utilized in the Examples. The spectrum of each polymer reports a high degree of isotacticity (isotactic triad (mm) measured by $^{13}$C NMR of greater than 0.94) and the unique regio-errors of these propylene-ethylene copolymers. The $^{13}$C NMR spectrum of FIG. 3 is that of a propylene-ethylene copolymer prepared using a metallocene catalyst. This spectrum does not report the regio-error (around 15 ppm) characteristic of the most preferred propylene-ethylene copolymers used in this invention.

Preferably, the propylene-alpha olefin copolymers have a molecular weight distribution (MWD), defined as weight average molecular weight divided by number average molecular weight (Mw/Mn) of 3.5 or less, preferably 3.0 or less.

Molecular weight and molecular weight distributions of the propylene-alpha olefin copolymers are determined using gel permeation chromatography (GPC) on a Polymer Laboratories PL-GPC-220 high temperature chromatographic unit equipped with four linear mixed bed columns (Polymer Laboratories (20-micron particle size)). The oven temperature is at 160° C. with the autosampler hot zone at 160° C. and the warn zone at 145° C. The solvent is 1,2,4-trichlorobenzene containing 200 ppm 2,6-di-t-butyl-4-methylphenol. The flow rate is 1.0 milliliter/minute and the injection size is 100 microliters. About 0.2% by weight solutions of the samples are prepared for injection by dissolving the sample in nitrogen purged 1,2,4-trichlorobenzene containing 200 ppm 2,6-di-t-butyl-4-methylphenol for 2.5 hrs at 160° C. with gentle mixing.

The molecular weight determination is deduced by using ten narrow molecular weight distribution polystyrene standards (from Polymer Laboratories, EasiCal PS1 ranging from 580-7,500,000 g/mole) in conjunction with their elution volumes. The equivalent propylene-alpha olefin copolymer molecular weights are determined by using appropriate Mark-Houwink coefficients for polypropylene (as described by Th. G. Scholte, N. L. J. Meijerink, H. M. Schoffeleers, and A. M. G. Brands, J. Appl. Polym. Sci., 29, 3763-3782 (1984)) and polystyrene (as described by E. P. Otocka, R. J. Roe, N.Y. Hellman, P. M. Muglia, Macromolecules, 4, 507 (1971)) in the Mark-Houwink equation:

$$\{N\}=KM^a$$

where $K_{pp}$=1.90E-04, $a_{pp}$=0.725 and $K_{ps}$=1.26E-04, $a_{ps}$=0.702.

Differential Scanning Calorimetry

Differential scanning calorimetry (DSC) is a common technique that can be used to examine the melting and crystallization of semi-crystalline polymers. General principles of DSC measurements and applications of DSC to studying semi-crystalline polymers are described in standard texts (e.g., E. A. Turi, ed., *Thermal Characterization of Polymeric Materials*, Academic Press, 1981). Differential Scanning Calorimetry (DSC) analysis is determined using a model Q1000 DSC from TA Instruments, Inc. Calibration of the DSC is done as follows. First, a baseline is obtained by running the DSC from –90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to –30° C. at a cooling rate of 10° C./min. The sample is kept isothermally at –30° C. for 2 minutes and heated to 30° C. at a heating rate of 10° C./min. The onset of melting is determined and checked to be within 0.5° C. from 0° C.

The propylene-alpha olefin copolymer samples are pressed into a thin film at a temperature of 190° C. About 5 to 8 mg of sample is weighed out and placed in the DSC pan. The lid is crimped on the pan to ensure a closed atmosphere. The sample pan is placed in the DSC cell and then heated at a high rate of about 100° C./min to a temperature of about 30° C. above the melt temperature. The sample is kept at this temperature for about 3 minutes. Then the sample is cooled at a rate of 10° C./min to –40° C., and kept isothermally at that temperature for 3 minutes. Consequently the sample is heated at a rate of 10° C./min until complete melting. The resulting enthalpy curves are analyzed for peak melt temperature (if present), onset and peak crystallization temperatures, heat of fusion and heat of crystallization, temperature at which melting of the copolymer ends ($T_{me}$), and any other quantity of interest from the corresponding thermograms as described in U.S. Pat. No. 6,960,635B2. The factor that is used to convert heat of fusion into nominal weight % crystallinity is 165 J/g=100 weight % crystallinity. With this conversion factor, the total crystallinity of a propylene-alpha olefin copolymer (units: weight % crystallinity) is calculated as the heat of fusion divided by 165 J/g and multiplied by 100%.

Broad Crystallinity Distribution

In a particularly preferred aspect of the invention, the propylene-alpha olefin copolymers exhibit a broad crystallinity distribution. The inventors believe that the use of a propylene-alpha olefin copolymers (preferably a propylene-ethylene copolymer) having a broad crystallinity distribution will result in compositions having lower stickiness/blocking characteristics compared to compositions incorporating copolymers made with metallocene catalysts and/or Ziegler-Natta catalysts. Preferably, nonmetallocene, metal-centered, heteroaryl ligand catalysts (as described earlier) are utilized to manufacture the propylene-alpha olefin copolymers, due to their ability to manufacture copolymers exhibiting a broad crystallinity distribution. Particularly preferred are propylene-ethylene copolymers manufactured with such nonmetallocene, metal-centered, heteroaryl ligand catalysts. It is believed that broad crystallinity distribution propylene-ethylene copolymers manufactured with such nonmetallocene, metal-centered, heteroaryl ligand catalysts will crystallize faster than narrow crystallinity distribution propylene-ethylene copolymers having an equivalent percentage of units derived from ethylene.

Though not intended to be limited by theory, broader crystallinity distribution may translate to increased upper service temperature which is measurable by methods such as dynamic mechanical thermal analysis, more specifically a storage modulus that persists to higher temperatures. Faster crystallization may translate to various advantages including but not limited to less stickiness, faster set-up (solidification) upon cooling, and higher line-speeds. Faster crystallization may be measured using a number of methods known to those of average skill in the art. These methods include but are not limited to differential scanning calorimetry (DSC), microscopy, X-ray diffraction, specific gravity, and mechanical properties. Particular processes that may benefit from the above mentioned advantages include but are not limited to film extrusion, film blowing, injection molding, fiber spinning, profile and sheet extrusion, tape extrusion, and wire and cable application.

For propylene-ethylene copolymers having a heat of fusion greater than about 20 Joules/gram, the crystallinity distribution preferably is determined from TREF/ATREF analysis as described below.

The determination of crystallizable sequence length distribution can be accomplished on a preparative scale by temperature-rising elution fractionation (TREF). The relative mass of individual fractions can be used as a basis for estimating a more continuous distribution. L. Wild, et al., *Journal of Polymer Science: Polymer. Physics Ed.*, 20, 441 (1982), scaled down the sample size and added a mass detector to produce a continuous representation of the distribution as a function of elution temperature. This scaled down version, analytical temperature-rising elution fractionation (ATREF), is not concerned with the actual isolation of fractions, but with more accurately determining the weight distribution of fractions.

While TREF was originally applied to copolymers of ethylene and higher α-olefins, it can also be used for the analysis of isotactic copolymers of propylene with ethylene (or higher α-olefins). The analysis of copolymers of propylene requires higher temperatures for the dissolution and crystallization of pure, isotactic polypropylene, but most of the copolymerization products of interest elute at similar temperatures as observed for copolymers of ethylene. The following table is a summary of conditions used for the analysis of copolymers of propylene. Except as noted the conditions for TREF are consistent with those of Wild, et al., ibid, and Hazlitt, *Journal of Applied Polymer Science: Appl. Polym. Symp.*, 45, 25 (1990).

TABLE B

Parameters Used for TREF

| Parameter | Explanation |
|---|---|
| Column type and size | Stainless steel shot with 1.5 cc interstitial volume |
| Mass detector | Single beam infrared detector IR4 purchased from PolymerChar of Valencia, Spain |
| Injection temperature | 150° C. |
| Temperature control device | GC oven |
| Solvent | 1,2,4-trichlorobenzene |
| Flow Rate | 1.0 ml/min. |
| Concentration | 0.1 to 0.3% (weight/weight) |
| Cooling Rate 1 | 140° C. to 120° C. @ −6.0° C./min. |
| Cooling Rate 2 | 120° C. to 44.5° C. @ −0.1° C./min. |
| Cooling Rate 3 | 44.5° C. to 20° C. @ −0.3° C./min. |
| Heating Rate | 20° C. to 140° C. @ 1.8° C./min. |
| Data acquisition rate | 12/min. |

The data obtained from TREF are expressed as a normalized plot of weight fraction as a function of elution temperature. The separation mechanism is analogous to that of copolymers of ethylene, whereby the molar content of the crystallizable component (ethylene) is the primary factor that determines the elution temperature. In the case of copolymers of propylene, it is the molar content of isotactic propylene units that primarily determines the elution temperature.

One statistical factor that can be used to describe the crystallinity distribution of a propylene-alpha olefin copolymers is the skewness, which is a statistic that reflects the asymmetry of the TREF curve for a particular polymer. Equation 1 mathematically represents the skewness index, $S_{ix}$, as a measure of this asymmetry.

Equation 1.

$$S_{ix} = \frac{\sqrt[3]{\sum w_i * (T_i - T_{Max})^3}}{\sqrt{\sum w_i * (T_i - T_{Max})^2}}$$

The value, $T_{Max}$, is defined as the temperature of the largest weight fraction eluting between 50 and 90° C. in the TREF curve. $T_i$ and $w_i$ are the elution temperature and weight fraction respectively of an abitrary, $i^{th}$ fraction in the TREF distribution. The distributions have been normalized (the sum of the $w_i$ equals 100%) with respect to the total area of the curve eluting above 30° C. and less than 90° C. Thus, the index reflects only the shape of the crystallized polymer containing comonomer (ethylene) and any uncrystallized polymer (polymer still in solution at or below 30° C.) has been omitted from the calculation shown in Equation 1. In a particularly preferred aspect of the current invention the propylene-alpha olefin copolymer utilized has a broad crystallinity distribution indicated by a skewness index for the propylene-alpha olefin copolymer of greater than (−1.2), preferably greater than −1.0, more preferably greater than −0.8, and further more preferably greater than −0.7, and in some instances greater than −0.60. Such a skewness index is indicative of a propylene-alpha olefin copolymer having a broad crystallinity distribution.

In addition to the skewness index, another measure of the breadth of the TREF curve (and therefore a measure of the breadth of the crystallinity distribution of a copolymer is the Median Elution Temperature of the final eluting quartile ($T_{M4}$). The Median Elution Temperature is the median elution temperature of the 25% weight fraction of the TREF distribution (the polymer still in solution at or below 30° C. is excluded from the calculation as discussed above for skewness index) that elutes last or at the highest temperatures. The Upper Temperature Quartile Range ($T_{M4}$-$T_{Max}$) defines the difference between the Median Elution Temperature of the final eluting quartile and the peak temperature $T_{Max}$. In a particularly preferred aspect of the invention, the propylene-alpha olefin copolymers have broad crystallinity distributions indicated in part by an Upper Temperature Quartile Range of greater than 4.0° C., preferably at least 4.5° C., more preferably at least 5° C., further more preferably at least 6° C., most preferably at least 7° C., and in some instances, at least 8° C. and even at least 9° C. In general, higher values for the Upper Temperature Quartile Range correspond to broader crystallinity distributions for the copolymer. The Propylene-alpha olefin copolymers utilized in the invention preferably exhibit broad crystallinity distribution fulfilling the above-described Upper Temperature Quartile Range.

Further, in this particularly preferred aspect, propylene-alpha olefin copolymers utilized comprise propylene-ethylene copolymers and show unusual and unexpected results when examined by TREF. The distributions tend to cover a large elution temperature range while at the same time giving a prominent, narrow peak. In addition, over a wide range of ethylene incorporation, the peak temperature, $T_{Max}$, is near 60° C. to 65° C. In conventional propylene-based copolymers, for similar levels of ethylene incorporation, this peak moves to higher elution temperatures with lower ethylene incorporation.

For conventional metallocene catalysts the approximate relationship of the mole fraction of propylene, $X_p$, to the TREF elution temperature for the peak maximum, $T_{Max}$, is given by the following equation:

$$\mathrm{Log}_e(X_p) = -289/(273+T_{max}) + 0.74$$

For the propylene-alpha olefin copolymers utilized in this particularly preferred aspect, the natural log of the mole fraction of propylene, LnP, is greater than that of the conventional metallocenes, as shown in this equation:

$$LnP > -289/(273+T_{max}) + 0.75$$

For propylene-alpha olefin copolymers exhibiting a heat of fusion of less than 20 Joules/gram heat of fusion, broad crystallinity distribution preferably is indicated by either the determination of the high crystalline fraction (HCF) using DSC or by the determination of the relative composition drift (RCD) using GPC-FTIR. These analyses are performed as follows:

The High Crystalline Fraction, HCF, is defined as the partial area in the DSC melting curve for the propylene-alpha olefin copolymer above 128° C. The partial area is obtained by first obtaining the heat of fusion, then dropping a vertical line at 128° C. and obtaining the partial area above 128° C. (relative to the same baseline as was used for the heat of fusion). The propylene-ethylene copolymers utilized in a particularly preferred aspect of the current invention have a heat of fusion of less than 20 Joules/gram and have a HCF fraction of greater than about 0.1 J/g and an ethylene content of greater than about 10% by weight, more preferably the HCF will be greater than 0.2 J/g, and most preferably the HCF will be greater than about 0.5 J/g and also have an ethylene content of greater than about 10% by weight.

FIG. 4 shows a comparison of broad and narrow crystallinity distributions by DSC for a propylene-ethylene copolymer (P-E 1) similar to P/E-4 of the Examples, except it has a melt flow rate of 12 gram/10 min, a content of units derived from ethylene of 15 percent by weight, a heat of fusion of about 9.6 J/g, and a MWD of 2.46, and a metallocene catalyzed propylene-ethylene copolymer having about 13.7 weight percent units derived from ethylene and a melt flow rate of approximately 150 g/10 minutes. The figure also shows the high crystalline fraction (HCF) partial area relative to the area representing the heat of fusion.

As an alternative or adjunct to the DSC method described above, the relative breadth of the crystallinity distribution for lower crystallinity copolymers can be established using GPC-FTIR methodologies [such as, R. P. Markovich, L. G. Hazlitt, L. Smith, *ACS Symposium Series: Chromatography of Polymers*, v. 521, pp. 270-276, 199; R. P. Markovich, L. G. Hazlitt, L. Smith, *Polymeric Materials Science and Engineering*, 65, 98-100, 1991; P. J. DesLauriers, D. C. Rohlfing, E. T. Hsieh, "Quantifying Short Chain Branching in Ethylene 1-olefin Copolymers using Size Exclusion Chromatography and Fourier Transform Infrared Spectroscopy (SEC-FTIR)", *Polymer*, 43 (2002), 159-170]. These methods, originally intended for ethylene based copolymers, can be readily adapted to the propylene based systems to provide copolymer composition as a function of polymer molecular weight. The propylene-ethylene copolymers exhibiting broad composition (with respect to ethylene incorporation) distributions, when measured as described in the following GPC-FTIR method, have also been found to exhibit broad crystallinity distributions as indicated by high HCF values in the above described DSC method. For this reason, for the purposes of the current invention, composition distribution and crystallinity distribution shall be regarded as congruent, in that the relative breadth of the crystallinity distribution as indicated by the magnitude of the HCF value for a low overall crystallinity copolymer (i.e. heat of fusion less than 20 Joules/gram) corresponds to a broader composition distribution as indicated by the magnitude of RCD (to be described below) measured by GPC-FTIR.

The various specifications and parameters for the GPC-FTIR analysis are given in Tables C and D. Sequential spectra are obtained from the GPC-FTIR system while dissolved copolymer fractions elute from the GPC column (in order of decreasing molecular weight) through an appropriately designed flow through cell [Part #0820-2000, Polymer Laboratories Inc., Amherst, Mass.]. An absorbance region from 2750 cm$^{-1}$ to 3050 cm$^{-1}$ within each FTIR spectrum is integrated as shown in FIG. 5 and recorded as a function of the spectrum number or elution volume and is used as a very good approximation of the mass (or concentration) at each spectrum number or elution volume in the GPC chromatogram. This integrated area is referred to as the total absorbance of the spectrum and is further normalized by dividing by the sum of all the other total area integrations for all the other spectra. This normalized total area is thus equal to the weight fraction of the total polymer represented by a given spectrum (at a specific elution volume). Therefore the weight fraction of eluted polymer is the Gaussian shaped curve in each of the FIGS. 7-8 which is derived from the normalized total areas of each spectrum. The propylene/ethylene composition in each set of sequential spectrum (or at each successive elution volume) is estimated using the partial area of the absorbances in the spectrum occurring at greater than 2940 cm$^{-1}$ as shown in FIG. 5 using a calibration curve (as for example in FIG. 6). The calibration is prepared by integrating the averaged eluted spectra for several copolymers whose composition was previously determined by NMR using the methods found herein. Thus the composition (ethylene weight fraction) can be determined for each spectrum and plotted as a function of spectrum number or elution volume. These distributions are depicted in FIG. 7-8.

Finally, the breadth of any particular GPC-FTIR composition distribution (and by the definition described above, the relative crystallinity distribution) can be estimated by comparing the maximum and minimum ethylene content (of the fractions) using only the spectra with the highest total absorbance (i.e the highest polymer concentration) that when summed give 95% (by weight) of the eluted polymer and ignoring the spectra with the lowest total absorbance (or the "wings" in the GPC curve as shown in FIGS. 7 and 8). This is necessary to avoid problems arising from low signal to noise. The maximum and minimum values are chosen as the median value of the three highest and lowest calculated ethylene values, respectively, among the 95% (by weight) of spectra for which compositions are calculated. The difference between the maximum and the minimum ethylene composition divided by the averaged calculated whole polymer ethylene composition is defined as the relative compositional drift or RCD and is expressed as a percentage. If the eluting species having the highest ethylene content occur at a higher molecular weight (i.e. at earlier elution volumes) than the species having the lowest ethylene content, then the RCD value is positive, otherwise it is negative Propylene-ethylene copolymers utilized in particularly preferred aspect of the invention exhibit a broad crystallinity distribution as defined by a RCD greater than about 15%, more preferably greater than 30%, and most preferably greater than 45%. Further, in the most preferred aspect the values of RCD exhibited by these propylene-ethylene copolymers are positive. In this particularly preferred aspect, the propylene-alpha olefin copolymers exhibit both a broad crystallinity distribution and also, on average, have polymer chains which have higher ethylene incorporation and higher molecular weight relative to the polymeric chains incorporating lower amounts of ethylene.

Molecular weights are calculated from the reported weight average molecular weight, Mw, and the reported number average molecular weight, Mn, for each polymer. These are obtained from analyses described elsewhere in this document. Each sequential spectrum number (or elution volume) can be converted to a molecular weight by solving the following simultaneous equations.

$$M_w = \sum_{s=0}^{N} w_s \cdot M_S$$

$$M_n = \left[\sum_{s=0}^{N} w_s / M_S\right]^{-1}$$

$$\text{Log\_M}_s = m \cdot S + b$$

In these equations, S is the spectrum number (which is analogous to the elution volume) for each of the N+1 ($0 \leq S \leq N$) sequential FTIR spectra, $M_S$ is the molecular weight at the spectrum number, S, $w_S$ is the normalized total area for the spectrum, S, and m and b are the necessary coefficients to calculate the molecular weight at each spectrum, S. These equations are easily solvable using tools such as SOLVER* [Microsoft Corp., Redmond, Wash.], by, for example, minimizing the following function for a and b:

$$f(a, b) = \left[1 - \frac{Mw}{M_w}\right]^2 + \left[1 - \frac{Mn}{M_n}\right]^2$$

$$= \left[1 - \frac{Mw}{\sum_{s=0}^{N} w_s \cdot M_S}\right]^2 + \left[1 - Mn \cdot \sum_{s=0}^{N} w_s / M_S\right]^2$$

TABLE C

Summary of FTIR [Thermo Electron Corp., Waltham, MA] parameters

DATA COLLECTION INFORMATION

Number of sample scans: 32
Sampling interval: 9.32 sec
Resolution: 4.000
Levels of zero filling: 0
Number of scan points: 8480
Number of FFT points: 8192
Laser frequency: 15798.3 cm − 1
Interferogram peak position: 4096
Apodization: Happ-Genzel

TABLE C-continued

Summary of FTIR [Thermo Electron Corp., Waltham, MA] parameters

Number of background scans: 0
Background gain: 0.0
DATA DESCRIPTION

Number of points: 1738
X-axis: Wavenumbers (cm − 1)
Y-axis: Single Beam
First X value: 649.9036
Last X value: 3999.7031
Data spacing: 1.928497
SPECTROMETER DESCRIPTION Spectrometer: Magna System 560
Source: IR
Detector: MCT/A
Beamsplitter: KBr
Sample spacing: 2.0000
Digitizer bits: 20
Mirror velocity: 3.1647
Aperture: 95.00
Sample gain: 1.0
High pass filter: 200.0000
Low pass filter: 20000.0000
DATA PROCESSING HISTORY Data collection type: GC/IR
Total collection time: 30.01
Final format: Single Beam
Resolution: 4.000
from 649.9036 to 3999.7031
SERIES DESCRIPTION Minimum value: 0.1553
Maximum value: 30.0080
Step size: 0.1555
Number of spectra: 193

TABLE D

Summary of Flow through cell [Polymer Laboratories Inc., Amherst, MA.] and GPC[Waters Corp., Milford, MA.] parameters Polymer Labs FTIR Interface (Part # 0820-2000) with liquid connections on top
Cell Windows: Calcium fluoride (Dead volume: 70 μL, Path length: 1 millimeter)
GPC Instrument: Waters150C High Temperature GPC
Columns: 4 × 300 × 7.5 millimeter Polymer Labs 10 micron Mixed B
Solvent: Perchloroethylene (Sigma-Aldrich HPLC grade)
Flow Rate: 1 mL/min.
Concentration: 2.5 mg/mL
Injection: 250 μL
Temperatures: 110° C.

FIG. 5 shows an example infrared spectrum for a propylene-ethylene copolymer. The spectrum is from a GPC-FTIR system and shows the carbon-hydrogen stretching regions. The absorbances at frequencies greater than 2940 cm$^{-1}$ are calculated as a fraction of the total absorbance from 2750 cm$^{-1}$ to 3050 cm$^{-1}$ and used to calculate the weight fraction of propylene.

FIG. 6 shows the calibration used to calculate the propylene weight fraction using the total area and a partial area from the absorbances at frequencies greater than 2940 cm$^{-1}$ in an infrared spectrum such as in FIG. 5.

FIG. 7 shows the composition distribution by GPC-FTIR for the propylene-ethylene copolymer (P-E 1) of FIG. 4. The key data represented are the total normalized absorbance at each spectrum (elution volume), the ethylene weight fraction for each spectrum (elution volume), and the relative composition drift ("RCD") for the composition distribution. Compositions are only calculated for 95% (by weight) of the spectra representing the highest concentrations of the polymer to avoid errors caused by low signal to noise.

FIG. 8 shows the composition distribution by GPC-FTIR for a metallocene propylene ethylene copolymer having 13.7 percent by weight units derived from ethylene (as calculated by the NMR method described earlier). The key data represented are the total normalized absorbance at each spectrum (elution volume), the ethylene weight fraction for each spectrum (elution volume), and the relative composition drift ("RCD") for the composition distribution. Compositions are only calculated for 95% (by weight) of the spectra representing the highest concentrations of the polymer to avoid errors caused by low signal to noise.

The melt flow rate ("MFR") of the propylene-alpha olefin copolymer useful for invention has a melt flow rate of at least 0.1 g/10 min, typically at least 0.2 g/10 min, preferably at least 1.0 g/10 min, more preferably at least 1.5 g/10 min, most preferably at least 3 g/10 min. The MFR of the propylene-alpha olefin copolymer useful for invention typically has a melt flow rate of at most 100 g/10 min, preferably less than 75 g/10 min, more preferably less than 60 g/10 min, further more preferably less than 50 g/10 min, most preferably less than 40 g/10 min, and even more preferably less than 30 g/10 min. Melt flow rate (MFR). measurement for the propylene-alpha olefin copolymers is determined according to ASTM D-1238, Condition 230° C./2.16 kilogram (kg) weight. The melt flow rate is inversely proportional to the molecular weight of the polymer. Thus, the higher the molecular weight, the lower the melt flow rate, although the relationship is not linear.

Additional Components:

Various tackifying resins, as known to one of ordinary skill in the art, can be used in the present invention. Such tackifying resins preferably are utilized where it is desirable to adhere an article incorporating the inventive composition to another article or component of an article. For example, when the inventive composition is utilized as one component of a laminated article and it is desirable for such a component to adhere to one or more than one of the layers. (For example, in an application where the inventive composition is utilized as a pressure sensitive adhesive layer to bond a elastomeric sheet or film to another web or layer of material).

Examples of tackifying resins which can be incorporated into the inventive composition include hydrogenated hydrocarbon resins, such as REGALREZ hydrocarbon resins (fully hydrogenated α-methyl styrene-type low molecular weight hydrocarbon resins, produced by polymerization and hydrogenation of pure monomerhydrocarbon feed stocks which are available from Hercules Incorporated), and ARKON P series tackifiers (a hydrogenated hydrocarbon resin available from AK Elastomers, Tokyo, Japan); and terpene hydrocarbon resins. Extending oils also may be added to the formulations of the inventive compositions. An exemplary extending oil is a white mineral oil available under the trade designation Drakeol 34 from the Pennzoil Company Pennreco Division. Drakeol 34 has a specific gravity of 0.864-0.878 at 15° C., a flash point of 238° C., and viscosity of 370-420 SUS at 38° C. Suitable vegetable oils and animal oils or their derivatives may also be used as the extending oil.

The term "consisting essentially of" indicates that in addition to specified elements, materials, or steps; elements, materials, or steps that do not materially affect the basic and novel characteristics of the subject invention are optionally also present. For example, additives which are commonly used with propylene-based polymers at levels known to one of skill in the art can be optionally added within the scope of the invention. "Consisting essentially of" for purposes of this invention includes a composition including a propylene-alpha olefin copolymer, a styrenic block copolymer, and may also include the tackifying resins described above and other additional components not adversely affecting the physical properties of the invention. Exemplary additional components include, without limitation, pigments, antioxidants, stabilizers, surfactants, waxes, flow promoters, solvents, oils, particulates, and materials added to enhance processability and handling of the composition.

Blending of the Components:

The compositions can be made by: (a) dry Blending of the component; (b) direct feeding of the components via a blender system (volumetric or gravimetric) mounted on an extruder; (c) compounding the components in a compounding extruder producing a compounded product; and/or (d) any other blending techniques known to one of ordinary skill in the art. Preferably, the composition is formed into pellets for ease of shipping and handling in downstream fabrication equipment.

End-Use Applications and Fabricated Articles:

The composition can beneficially be used in numerous fabrication processes to make advantaged articles. Some examples of these articles and processes are: (1) films, both cast and air and water quenched flown films: suitable cast film and air quenched blown film processes are described, for example, in *The Encyclopedia of Chemical Technology*, Kirk-Othmer, Third Edition, John Wiley & Sons, New York, 1981, Vol. 16, pp. 416-417 and Vol. 18, pp. 191-192. Suitable coextrusion techniques and requirements are known to one of ordinary skill in the art; (2) Injection molding applications, such as described, for example, in Injection Molding Handbook, T. A. Osswald, T. Turng, P. Gramann, Hanser Gardner Publications, ISBN #1569903182, 2001; (3) thermoforming applications, such as described, for example, in Technology of Thermoforming J. L. Throne Hanser Gardner Publications, ISBN #1569901988, 1996; (4) melt blown fiber and nonwoven fabric applications, such as are described in *The Nonwovens Handbook*, Association of Nonwovens Fabrics Industry, Cary N.C. and Principles of Nonwovens, INDA, Cary N.C.; and (5) spunbond fibers and nonwoven fabrics, such as described in *Nonwoven Fabrics: Raw Materials, Manufacture, Applications, Characteristics, Testing Processes* W. Albrecht, H. Fuchs, W. Kittelmann, ISBN#3527304061, Wiley-VCH, 2003.

EXAMPLES

For the invention, elongation at break, 2% secant tensile modulus, and tensile strength (stress at break) are all measured using the procedure described below and the sample geometry of ASTM D1708 with an initial gauge length of 22.25 millimeters and an extension rate of 111.25 millimeters/minute (a strain rate of 500%/minute).

The following resins are utilized in the examples:

P/E-1 is a propylene-ethylene plastomer made using Catalyst A in a polymerization method similar to the polymerization procedure described below. P/E-1 has a weight average molecular weight of 153.9 kg/mol, a number averaged molecular weight of 69.9 kg/mol, molecular weight distribution of 2.2, a melt flow rate of 26.4 g/10 min, a tacticity of at least 90% triads, an ethylene content of 8.9 weight percent, a density of 0.8746 grams per cubic centimeter (g/cc), a heat of fusion of 47.1 Joules/gram, exhibits a flexural modulus of 80.3 MPa according to ASTM D790, exhibits a tensile modulus (2% Secant Modulus) of 82.9 MPa as determined using ASTM D1708 geometry, a tensile strength of 22.8 MPa as determined using ASTM D1708 geometry, an elongation to break of 875%, and has a broad crystallinity distribution determined according to the procedures described above.

P/E-2 is a propylene-ethylene elastomer made using Catalyst A in a polymerization method similar to the polymerization procedure described below. P/E-2 has a weight average molecular weight of 152.5 kg/mol, a number averaged molecular weight of 69.8 kg/mol, molecular weight distribution of 2.2, a melt flow rate of 23.8 g/10 min, a tacticity of at least 90% triads, an ethylene content of 11.3 weight percent, a density of 0.8668 g/cc, a heat of fusion of 28.5 Joules/gram, exhibits a flexural modulus of 38.1 MPa according to ASTM D790, exhibits a tensile modulus (2% secant modulus) of 37.8 as determined using ASTM D1708 geometry, a tensile strength of 18.8 MPa as determined using ASTM D1708 geometry, an elongation to break of 960% and has a broad crystallinity distribution determined according to the procedures described above.

P/E-3 is a propylene-ethylene elastomer made using Catalyst A in a polymerization method similar to the polymerization procedure described below. P/E-3 has a weight average molecular weight of 290 kg/mol, a number averaged molecular weight of 118.4 kg/mol, molecular weight distribution of 2.5, a melt flow rate of 1.8 g/10 min, a tacticity of at least 90% triads, an ethylene content of 12.3 weight percent, a density of 0.8652 g/cc, a heat of fusion of 22 Joules/gram, exhibits a flexural modulus of 28.0 MPa according to ASTM D790, exhibits a tensile modulus (2% secant modulus) of 27.2 as determined using ASTM D1708 geometry, a tensile strength of 17.1 MPa as determined using ASTM D1708 geometry, an elongation to break of 990% and has a broad crystallinity distribution determined according to the procedures described above.

P/E-4 is a propylene-ethylene elastomer made using Catalyst A in a polymerization method similar to the polymerization procedure described below. P/E-4 has a weight average molecular weight of 274.9 kg/mol, a number averaged molecular weight of 113.8 kg/mol, a molecular weight distribution of 2.42, a melt flow rate of 1.8 g/10 min, a tacticity of at least 90% triads, an ethylene content of 15.2 weight percent, a density of 0.8588 g/cc, a heat of fusion of 0 Joules/gram, exhibits a flexural modulus of 11.4 MPa according to ASTM D790, exhibits a tensile modulus (2% Secant Modulus) of 7.3 MPa as determined using ASTM D1708 geometry, a tensile strength of 12 MPa as determined using ASTM D1708 geometry, an elongation to break of 1130%, and has a broad crystallinity distribution determined according to the procedures described above.

RCPP is a 5.0 gram/10 minute melt flow rate random propylene-ethylene random copolymer polypropylene made with a Ziegler-Natta catalyst which is available from The Dow Chemical Company under the grade designation DS6D81 having a 1% secant flexural modulus of 550 MPa (by ASTM D790), 5.7 percent by weight units derived from ethylene and a density of 0.9.

G-1657 is a linear SEBS styrenic block copolymer available from Kraton Polymers (Houston, Tex., United States) having a density of 0.9 g/mL, with from 12 to 14 percent by weight polystyrene units, exhibiting a solution viscosity of from 1200 to 1800 centipoise (cps), with a diblock content of 30% and a styrene to rubber ratio of 13/87 by weight.

Catalyst A

Synthesis of Catalyst A

Hafnium, [N-[2,6-bis(1-methylethyl)phenyl]-α-[2-(1-methylethyl)phenyl]-6-(1-naphthanlenyl-κ-$C^2$)-2-pyridinemethanaminato(2-)-κ$N^1$,κ$N^2$]dimethyl-

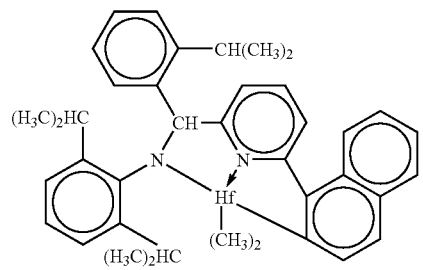

a) 2-Formyl-6-bromopyridine. This compound is synthesized according to literature procedures, *Tetrahedron Lett.*, (2001) 42, 4841.

b) 6-Bromo-2-(2,6-diisopropylphenyl)iminopyridine). A dry, 500 mL 3-neck round bottom flask is charged with a solution of 2-formyl-6-bromopyridine (72.1 g, 383 mmol) and 2,6-diisopropylaniline (72.5 g, 383 mmol) in 500 mL of anhydrous toluene containing 0.3 nm pore size molecular sieves (6 g) and 80 mg of p-TsOH. The reactor is equipped with a condenser, an over head mechanical stirrer and a thermocouple well. The mixture is heated to 70° C. under $N_2$ for 12 h. After filtration and removal of the volatiles under reduced pressure, a brown oil is isolated. Yield was 109g, 81.9 percent.

GC/MS 346 ($M^+$), 331, 289, 189, 173, 159, 147, 131, 116, 103, 91, 78.

c) 6-(1-Naphthyl)-2-[(2,6-diisopropylphenyl)imino]pyridine. Naphthylboronic acid (54.5 g, 316 mmol) and $Na_2CO_3$ (83.9 g, 792 mmol) are dissolved into 200 mL of degassed 1:1 $H_2O$/EtOH. This solution is added to a toluene solution (500 mL) of 6-bromo-2-(2,6-diisopropylphenyl)-iminopyridine (109 g, 316 mmol). Inside of a dry box, 1 g (0.86 mmol) of tetrakis(triphenyl-phosphine)palladium(0) is dissolved in 50 mL of degassed toluene. The solution is removed from the dry box and charged into the $N_2$ purged reactor. The biphasic solution is vigorously stirred and heated to 70° C. for 4-12 hours. After cooling to room temperature, the organic phase is separated, the aqueous layer is washed with toluene (3×75 mL), the combined organic extracts are washed with $H_2O$ (3×200 mL) and dried over $MgSO_4$. After removing the volatiles under reduced pressure, the resultant light yellow oil is purified via recrystallization from methanol to give a yellow solid. Yield 109 g, 87.2 percent; mp 142-144° C.

$^1$H NMR ($CDCl_3$) δ 1.3 (d, 12H), 3.14 (m, 2H), 7.26 (m, 3H), 7.5-7.6 (m, 5H), 7.75-7.8 (m, 3H), 8.02 (m 1H), 8.48 (m, 2H).

$^{13}$C NMR ($CDCl_3$) δ23.96, 28.5, 119.93, 123.50, 124.93, 125.88, 125.94, 126.49, 127.04, 127.24, 128.18, 128.94, 129.7, 131.58, 134.5, 137.56, 137.63, 138.34, 148.93, 154.83, 159.66, 163.86.

GC/MS 396 ($M^+$), 380, 351, 337, 220, 207, 189, 147.

d) 2-Isopropylphenyl lithium. Inside an inert atmosphere glovebox, n-butyl lithium (52.5 mmol, 21 mL of 2.5M in hexanes) is added by addition funnel over a period of 3545 min to an ether solution (50 mL) of 2-isopropyl bromobenzene (9.8 g, 49.2 mmol). After the addition is complete, the mixture is stirred at ambient temperature for 4 h. Then, the ether solvent is removed under vacuum overnight. The next day hexane is added to the remaining white solid and the mixture filtered, washed with additional hexane, and then vacuum dried. 2-Isopropylphenyl lithium (4.98 g, 39.52 mmol) is collected as a bright white powder. A second crop of product (0.22 g) is later obtained from a second filtration of the original hexane filtrant.

$^1$H NMR (d$_8$-THF) δ 1.17 (d, J=6.8 Hz, 6H), 2.91 (sept, J=6.8, 1H), 6.62-6.69 (multiplets, 2H), 6.77 (d, J=7.3 Hz, 1H), 7.69 (multiplet, 1H).

$^{13}$C NMR (d$_8$-THF) δ 25.99, 41.41, 120.19, 122.73, 122.94, 142.86, 160.73, 189.97.

e) 2-pyridinemethanamine, N-[2,6-bis(1-methylethyl)phenyl]-α-[2-(1-methylethyl)phenyl]-6-(1-naphthanlenyl).

The imine, 6-(1-naphthyl)-2-[(2,6-diisopropylphenyl)imino]pyridine of step c) (2.20 g, 5.6 mmol) is magnetically stirred as a slurry in 60-70 mL of dry ether under a nitrogen atmosphere. An ether solution of 2-isopropylphenyl lithium (1.21 g, 9.67 mmol in 25 mL dry ether) is added slowly using a syringe over a period of 4-5 min. After the addition is complete, a small sample is removed, quenched with 1N NH$_4$Cl and the organic layer analyzed by high pressure liquid chromatography (HPLC) to check for complete consumption of starting material. The remainder of the reaction is quenched by the careful, slow addition of 1N NH$_4$Cl (10 mL). The mixture is diluted with more ether and the organic layer washed twice with brine, dried (Na$_2$SO$_4$), filtered, and stripped of solvent under reduced pressure. The crude product obtained as a thick red oil (2.92 g; theoretical yield=2.87 g) is used without further purification.

$^1$H NMR (CDCl$_3$) δ 0.96 (d, J=6.6 Hz, 3H), 1.006 (d, J=6.8 Hz, 3H), 1.012 (d, J=6.8 Hz, 6H), 1.064 (d, J=6.8 Hz, 6H), 3.21-3.34 (multiplets, 3H), 4.87 (br s, NH), 5.72 (s, 1H), 6.98 (d, J=7.6 Hz, 1H) 7.00-7.20 (multiplets, 7H), 7.23-7.29 (multiplets, 4H), 7.51 (d, J=7.1 Hz 1H), 7.60-7.65 (multiplets, 2H), 7.75 (multiplet, 1H), 8.18 (multiplet, 1H).

$^{13}$C NMR (CDCl$_3$) δ 23.80, 24.21, 24.24, 24.36, 28.10, 28.81, 67.08, 120.20, 122.92, 123.96, 124.42, 125.35, 125.81, 126.01, 126.28, 126.52, 126.58, 126.65, 127.80, 128.52, 128.62, 129.25, 131.82, 134.52, 136.81, 138.82, 140.94, 143.37, 143.41, 146.66, 159.05, 162.97.

f) Hafnium, [N-[2,6-bis(1-methylethyl)phenyl]-α-[2-(1-methylethyl)phenyl]-6-(1-naphthanlenyl-κ-C$^2$)-2-pyridinemethanaminato(2-)-κN$^1$, κN$^2$]-dimethyl- A glass jar is charged with 8.89 mmol of the ligand from step e) dissolved in 30 mL toluene. To this solution is added 8.98 mmol of n-BuLi (2.5 M solution in hexanes) by syringe. This solution is stirred for 1 hour, then 8.89 mmol of solid HfCl$_4$ are added. The jar is capped with an air-cooled reflux condenser and the mixture is heated at reflux for 1 hour. After cooling, 31.1 mmol of MeMgBr (3.5 equivalents, 3.0 M solution in diethyl ether) are added by syringe and the resulting mixture stirred overnight at ambient temperature. Solvent (toluene, hexanes and diethyl ether) is removed from the reaction mixture using a vacuum system attached to the drybox. Toluene (30 mL) is added to the residue and the mixture filtered, and the residue (magnesium salts) is washed with additional toluene (30 mL). Solvent is removed by vacuum from the combined toluene solution, and hexane is added, then removed by vacuum. Hexane is again added and the resulting slurry is filtered and the product washed with pentane to give the desired product as a yellow powder.

$^1$H NMR(C$_6$D$_6$): δ 8.58 (d, J=7.8 Hz, 1H), 8.25 (d, J=8.4 Hz, 1H), 7.82 (d, J=7.5 Hz, 1H), 7.72 (d, J=6.9 Hz, 1H), 7.50 (d, J=8.1 Hz, 1H), 7.36-7.27 (multiplets, 3H), 7.19-6.99 (multiplets, 7H), 6.82 (t, J=8.1 Hz, 1H), 6.57 (s, 1H), 6.55 (d, J=7.8 Hz, 1H), 3.83 (septet, J=6.9 Hz, 1H), 3.37 (septet, J=6.9 Hz, 1H), 2.89 (septet, J=6.9 Hz, 1H), 1.38 (d, J=6.6 Hz, 3H), 1.37 (d, J=6.9 Hz, 3H), 1.17 (d, J=6.9 Hz, 3H), 1.15 (d, J=7.2 Hz, 3H), 0.96 (s, 3H), 0.70 (s, 3H), 0.69 (d, J=5.4 Hz, 3H), 0.39 (d, J=6.9 Hz, 3H).

General Continuous Loop Solution Propylene-Ethylene Copolymerization Procedure

Propylene-ethylene copolymers are made according to the following procedure using Catalyst A.

The polymerization process is exothermic. There are ~900 BTU released per pound of propylene polymerized and ~1,500 BTU released per pound of ethylene polymerized. The primary process design consideration is how to remove the heat of reaction. The propylene-ethylene copolymers are produced in a low-pressure, solution polymerization loop reactor, made up of a 3" loop pipe plus two heat exchanges, the total volume of which is 50.3 gallons. Solvent and monomer (propylene) are injected into the reactor as a liquid. The comonomer (ethylene) gas is fully dissolved in the liquid solvent. The feed is cooled to 10° C. before injection into the reactor. The reactor operates at polymer concentrations equal to 20 wt %. The adiabatic temperature rise of the solution accounts for some of the heat removal from the polymerization reaction. Heat exchangers within the reactor are utilized to remove the remaining heat of reaction, allowing for reactor temperature control at 105° C.

The solvent used is a high purity iso-paraffinic fraction purchased from Exxon called Isopar E. Fresh propylene is passed through a bed of Selexsorb COS for purification prior to mixing with the recycle stream (contains solvent, propylene, ethylene, and hydrogen). The recycle stream is passed through a bed of 75 wt % Molecular Sieve 13x and 25 wt % Selexsorb CD for further purification before using a high pressure (700 psig) feed pump to pump the contents to the reactor. Fresh ethylene is passed through a Selexsorb COS bed for purification before compressing the stream to 750 psig. Hydrogen (a telogen used to reduce molecular weight) is mixed with the compressed ethylene before the two are mixed/dissolved into the liquid feed. The total stream is cooled to the appropriate feed temperature (10° C.). The reactor operates at 525 psig and a control temperature equal to 105° C. The propylene conversion in the reactor is maintained by controlling the catalyst injection rate. The reaction temperature is maintained by controlling the temperature across the shell side of the heat exchanger at 85° C. The residence time in the reactor is short, 10 minutes. The propylene conversion per reactor pass is 60 wt %.

Upon exiting the reactor, water and additive are injected into the polymer solution. The water hydrolyzes the catalyst, terminating the polymerization reaction. The additives consist of antioxidants, 500 ppm of Irganox™ 1010 and 1000 ppm of Irgafos™ 168, that remain with the polymer and act as stabilizers to prevent polymer degradation while in storage before subsequent fabrication at the end-user's facility. The post-reactor solution is super-heated from reactor temperature to 230° C. in preparation for a two-stage devolatilization. The solvent and unreacted monomers are removed during the devolatilization process. The polymer melt is pumped to a die for underwater pellet cutting.

Solvent and monomer vapors exiting the top of the devolatilizers are sent to a coalescer. The coalescer removes polymer entrained in the vapor during devolatilization. The clean vapor stream leaving the coalescer is partially condensed through a series of heat exchangers. The two-phase mixture enters a separation drum. The condensed solvent and monomers are purified (this is the recycle stream described above) and re-used in the reaction process. The vapors leaving the separating drum, mostly containing propylene and ethylene are sent to a block flare and burned. Propylene-ethylene copolymers made according to the above described process may be utilized for the propylene alpha olefin copolymers of the invention.

Blends of the propylene-ethylene copolymers (P/E-1 through P/E-4) and SEBS were dry blended together in a Haake Rheocord 9000 Torque Rheometer. The temperature during the blending was 210° C. During the blending, an antioxidant package of 1000 ppm Irganox 1010 and 1000 ppm Irgafos 168 was added. Blending of the components was continued for about 5 to 10 minutes until the torque measurements on the Rheometer had reached a steady state. The mixture was then removed from the mixing bowl and compression-molded into 1-2 millimeter thick plaques at 210° C. and a pressure of 100 to 300 p.s.i. The plaques were then immediately removed and immediately cooled by insertion into another mold set at 25° C. for about 3 to 5 minutes at about 100 to 300 psi pressure. The molded plaques were allowed to age at ambient conditions (23° C., 50% relative humidity) for at least 2 days. The blend formulations are summarized in Table I.

The aged plaques were prepared for mechanical testing as follows:

Stress-Strain Testing: Specimens for mechanical measurements were prepared according to ASTM D1708 (microtensile geometry) with the samples having an initial gauge length of 22.25 millimeter and an initial width of 4.8 millimeter. Tensile testing was performed in tension using an Instron (Model 5564) by gripping specimens with pneumatic grips and then pulling at a 500%/min (111.25 millimeters/min) strain rate until the samples break. Elongation at break (in percent) was taken as the change in crosshead displacement divided by the initial grip separation of 22.25 millimeter multiplied by 100%. Tensile modulus (2% secant) was taken as the slope of the line extended from 0% to the stress corresponding to 2% elongation. Stress is calculated by dividing the force by the cross sectional area at the narrowest portion of the sample geometry (4.8 millimeter width multiplied by initial sample thickness). Tensile strength was measured as the force at break normalized to the cross sectional area of the narrowest portion of the gauge length (4.8 millimeter) at the start of the experiment. The tensile properties are summarized in Table I

TABLE I

Tensile Properties of Blends and Controls

| Example # | A:B | A | B | 2% Sec Tensile Modulus (MPa) | Elongation at break (%) | Tensile Strength (MPa) |
|---|---|---|---|---|---|---|
| SEBS Control | 0:100 | — | G-1657 | 4.4 | 970 | 13.0 |
| CS 1-1 | 10:90 | P/E-1 | G-1657 | 5.8 | 810 | 10.0 |
| CS 1-2 | 20:80 | P/E-1 | G-1657 | 5.0 | 870 | 13.0 |
| CS 1-3 | 50:50 | P/E-1 | G-1657 | — | — | — |
| P/E-1 Control | 100:0 | P/E-1 | — | 71.8 | 887 | 24.4 |
| Ex 1-1 | 10:90 | P/E-2 | G-1657 | 2.5 | 930 | 10.0 |
| Ex 1-2 | 20:80 | P/E-2 | G-1657 | 5.4 | 960 | 12.0 |
| Ex 1-3 | 50:50 | P/E-2 | G-1657 | 13.6 | 980 | 16.0 |
| Ex 1-4 | 70:30 | P/E-2 | G-1657 | 16.4 | 1100 | 19.0 |
| P/E-2 Control | 100:0 | P/E-2 | — | 21.8 | 935 | 19.4 |
| Ex 2-1 | 30:70 | P/E-3 | G-1657 | 5.7 | 960 | 14.0 |
| Ex 2-2 | 50:50 | P/E-3 | G-1657 | 9.1 | 970 | 16.0 |
| Ex 2-3 | 70:30 | P/E-3 | G-1657 | 17.4 | 900 | 15.0 |
| P/E-3 Control | 100:0 | P/E-3 | — | 27 | 940 | 19 |
| Ex 3-1 | 30:70 | P/E-4 | G-1657 | 4.3 | 1000 | 10.0 |
| Ex 3-2 | 50:50 | P/E-4 | G-1657 | 4.4 | 1070 | 11.0 |
| Ex 3-3 | 70:30 | P/E-4 | G-1657 | 7.2 | 1250 | 11.0 |
| P/E-4 Control | 100:0 | P/E-4 | — | 7.3 | 1130 | 12 |
| CS 2-1 | 30:70 | RCPP | G-1657 | 5.1 | 820 | 17.5 |
| CS 2-2 | 50:50 | RCPP | G-1657 | 100 | 540 | 11.9 |
| CS 2-3 | 70:30 | RCPP | G-1657 | 300 | 680 | 19 |
| RCPP Control | 100:0 | RCPP | — | 510 | 30 | 790 |

As can be seen from Table I, the comparative blends CS 1-1 to CS 2-3 fail to provide the necessary elongation. Also, as can be seen from Table I, the blends made with P/E-2, 3 and 4 have much lower Tensile Modulus when the SEBS makes up less than fifty percent by weight (50 weight percent (wt %)) of the blend composition, than the comparative blends made with a random propylene ethylene copolymer having 5.7 percent by weight units derived from ethylene. Preferably, the tensile modulus (2% secant) exhibited by the composition is less than 20 MPa, preferably less than 17 MPa, more preferably less than 15 MPa further more preferably less than 13 MPa, most preferably less than 10 MPa, and in some embodiments less than 8 MPa.

One to two millimeters thick plaques, as described above, were tested to determine elastic performance. The elastic performance testing was carried out as follows:

Elastic performance is measured using a 2-cycle hysteresis measurement. Microtensile specimens are extended to a predetermined strain (100, 200, 300, 400, or 500%) at 500%/minute strain rate, returned to 0% strain, and then are extended until a positive load is measurement. The strain corresponding to this onset of load during the second extension (0.05 MPa) is taken as the immediate set. For the 100% strain 2-cycle tests, the stress at 30% strain for the first extension and retraction is measured. The ratio of retraction stress during the first retraction to the extension. stress during the first retraction at 30% strain multiplied by 100 is defined as R (see equation 2).

$$R = \frac{\sigma(\varepsilon = 30\%, \text{retraction})}{\sigma(\varepsilon = 30\%, \text{extension})} \times 100\% \quad \text{(Eq 2)}$$

R is a measure of hysteresis. In the limit of R equals 1, the retraction force at 30% strain equals the extension force at 30% strain. A value of 0 for R indicates no retractive force at 30% strain. R is preferably at least 20%, more preferably at least 25%, even more preferably at least 40%, and most preferably at least 50%.

The results of the elastic performance testing, including values for immediate set at various strains are shown in Table II, below.

TABLE II

Elastic Performance (Immediate Set after Various Applied Strains)

| | | | | Immediate Set (%) after | | | | | R from |
|---|---|---|---|---|---|---|---|---|---|
| Blend | A:B | A | B | Applied Strain 100% | Applied Strain 200% | Applied Strain 300% | Applied Strain 400% | Applied Strain 500% | Applied Strain 100% |
| SEBS Control | 0:100 | — | G-1657 | 7 | 15 | 23 | 30 | 35 | 73 |
| CS 1-1 | 10:90 | P/E-1 | G-1657 | 6 | 16 | 26 | — | 49.8 | 67 |
| CS 1-2 | 20:80 | P/E-1 | G-1657 | 8 | 16 | 29 | 39.7 | 65 | 62 |
| CS 1-3 | 50:50 | P/E-1 | G-1657 | 10 | 22 | 38 | 64 | 119 | — |
| P/E-1 Control | 100:0 | P/E-1 | — | 39 | 110 | 170 | 250 | 319 | 0 |
| Ex 1-1 | 10:90 | P/E-2 | G-1657 | 7 | 16 | 22 | 36 | 42 | 68 |
| Ex 1-2 | 20:80 | P/E-2 | G-1657 | 8 | 16 | 27 | 40 | 53 | 62 |
| Ex 1-3 | 50:50 | P/E-2 | G-1657 | 10.5 | 23 | 50 | 82 | 116 | 31 |
| Ex 1-4 | 70:30 | P/E-2 | G-1657 | 10 | 35 | 74 | 124 | 175 | 25 |
| P/E-2 Control | 100:0 | P/E-2 | — | 12.1 | 50.5 | 89 | 144 | 200 | 12 |
| Ex 2-1 | 30:70 | P/E-3 | G-1657 | 9 | 18 | 28 | 43 | 64 | 55 |
| Ex 2-2 | 50:50 | P/E-3 | G-1657 | 9 | 19.3 | 34 | 56 | 81 | 43 |
| Ex 2-3 | 70:30 | P/E-3 | G-1657 | 10 | 22.4 | 47 | 83 | 110 | 30 |
| P/E-3 Control | 100:0 | P/E-3 | — | 9 | 17 | 28 | 46 | 69 | 19 |
| Ex 3-1 | 30:70 | P/E-4 | G-1657 | 9 | 18 | 23 | 34 | 46 | 59 |
| Ex 3-2 | 50:50 | P/E-4 | G-1657 | 9 | 20 | 25 | 36.5 | 49 | 52 |
| Ex 3-4 | 70:30 | P/E-4 | G-1657 | 10 | 19 | 28 | 42 | 57 | 45 |
| P/E-4 Control | 100:0 | P/E-4 | — | 9 | — | — | — | — | 37 |
| CS 2-1 | 30:70 | RCPP | G-1657 | 7 | 19 | 40 | 83 | 133 | 57 |
| CS 2-2 | 50:50 | RCPP | G-1657 | 16 | 31 | 105 | 197 | 270 | 0 |
| CS 2-3 | 70:30 | RCPP | G-1657 | 54 | 134 | 222 | 316 | 410 | 0 |
| RCPP Control | 100:0 | RCPP | — | 74 | 167 | 261 | 355 | 449 | 0 |

As can be seen from Table I, the comparative blends CS 1-1 to CS 2-3 fail to provide the necessary elongations to break (i.e. none provide greater than 900% elongation at break). Furthermore, examples CS 2-1, CS 2-2, and CS 2-3 all exhibit immediate set values greater than 120% after the 500% 2-cycle hysteresis test. Such behavior makes these compositions disadvantaged for usage in high strain applications demanding elastic performance of current styrenic block copolymer formulations.

As can be seen from Table II, the blends incorporating propylene-ethylene copolymer having higher ethylene contents perform excellently at various blend ratios from 70:30 to 30:70 of component A:B. The blends incorporating propylene-ethylene copolymers having lower ethylene content having at least 22 J/g heat of fusion (P/E-2 and P/E-3) are more elastic (i.e. exhibit lower immediate values for set) when used at levels of less than 50 percent by weight of the blend.

I claim:
1. A film comprising:
   (a) from 30 wt % to less than 50 wt % of a propylene-alpha olefin copolymer having substantially isotactic propylene sequences and at least seventy weight percent (70 wt %) units derived from propylene and from ten to twenty-five weight percent (10-25 wt %) units derived from a $C_2$, or a $C_4$-$C_{10}$ alpha olefin, the propylene-alpha olefin exhibiting a heat of fusion by DSC analysis of from 0 Joule/gram to 37 Joules/gram and a melt flow rate of between 0.1 and 100 gram/10 minutes according to ASTM D-1238, Condition 230° C./2.16 kg; and
   (b) greater than 50 wt % to 70 wt % of a styrenic block copolymer, wherein the film exhibits the following:
   (1) 2% secant tensile modulus as measured using the geometry of ASTM D1708 at a 500%/minute strain rate of less than 17 MPa;
   (2) elongation at break of at least 900%;
   (3) tensile strength of at least 5 MPa as measured using the sample geometry of ASTM-D1708 and a 500%/minute strain rate;
   (4) a relative immediate set after an initial application of 400% strain of less than 2X, where X is the set exhibited by component (b) alone after the initial application of 400% strain.

2. The film of claim 1, wherein the film comprises 30 wt % of the propylene-alpha olefin copolymer and 70 wt % of the styrenic block copolymer.

3. The film of claim 1, wherein the film exhibits a 2% secant tensile modulus of less than 7 MPa.

4. The film of claim 1, wherein the film exhibits a 2% secant tensile modulus of less than 6 MPa.

5. The film of claim 1, wherein the film exhibits an elongation at break of at least 950%.

6. The film of claim 1, wherein the film exhibits an elongation at break of at least 1000%.

7. The film of claim 1, wherein the film exhibits a tensile strength of at least 10 MPa.

8. The film of claim 1, wherein the film composition exhibits a tensile strength of at least 15 MPa.

9. The film of claim 1, wherein the propylene-alpha olefin copolymer comprises a propylene-ethylene copolymer having from 11 to 17 weight percent units derived from ethylene.

10. The film of claim 1, wherein the propylene-alpha olefin copolymer comprises a propylene-ethylene copolymer having from 13-15 weight percent units derived from ethylene.

11. The film of claim 1, wherein the propylene-alpha olefin exhibits a heat of fusion of from 2 to 37 Joules/gram.

12. The film of claim 1, wherein the propylene-alpha olefin exhibits a heat of fusion of from 4 to 25 Joules/gram.

13. The film of claim 1, wherein the propylene-alpha olefin copolymer exhibits a skewness index of greater than −1.2.

14. The film of claim 1, wherein the propylene-alpha olefin copolymer is manufactured using a nonmetallocene, metal-centered, heteroaryl ligand catalyst.

15. The film of claim 13, wherein the propylene-alpha olefin copolymer is manufactured using a nonmetallocene, metal-centered, heteroaryl ligand catalyst.

16. A film comprising:
a two-component consisting essentially of
(a) from 30 wt % to less than 50 wt % of a propylene-alpha olefin copolymer having substantially isotactic propylene sequences and at least seventy weight percent (70 wt %) units derived from propylene and from ten to twenty-five weight percent (10-25 wt %) units derived from a $C_2$, or a $C_4$-$C_{10}$ alpha olefin, the propylene-alpha olefin exhibiting a heat of fusion by DSC analysis of from 2 Joules/gram to 30 Joules/gram and a melt flow rate of between 0.2 and 50 grams/10 minutes according to ASTM D-1238, Condition 230° C./2.16 kg; and
(b) greater than 50 wt % to 70 wt % of a styrenic block copolymer, wherein the film exhibits the following:
 (1) a 2% Secant tensile modulus as measured using the geometry of ASTM D1708 at a 500%/minute strain rate of less than 17 MPa;
 (2) elongation at break of at least 900%;
 (3) tensile strength of at least 5 MPa as measured using the sample geometry of ASTM-D1708 and a 500%/minute strain rate;
 (4) a relative immediate set after an initial application of 400% strain of less than 2X, where X is the set exhibited by component (B) alone after the initial application of 400% strain.

17. The film of claim 16, wherein the propylene-alpha olefin copolymer exhibits a skewness index of greater than −1.2.

18. The film of claim 16, wherein the propylene-alpha olefin copolymer is manufactured using a nonmetallocene, metal-centered, heteroaryl ligand catalyst.

* * * * *